(12) United States Patent
Skovenborg

(10) Patent No.: US 10,708,701 B2
(45) Date of Patent: Jul. 7, 2020

(54) SOUND LEVEL ESTIMATION

(71) Applicant: MUSIC TRIBE GLOBAL BRANDS LTD., Road Town, Tortola (VG)

(72) Inventor: Esben Skovenborg, Aarhus C (DK)

(73) Assignee: MUSIC TRIBE GLOBAL BRANDS LTD., Road Town (VG)

( * ) Notice: Subject to any disclaimer, the term of this patent is extended or adjusted under 35 U.S.C. 154(b) by 158 days.

(21) Appl. No.: 14/924,968

(22) Filed: Oct. 28, 2015

(65) Prior Publication Data

US 2017/0127206 A1 May 4, 2017

(51) Int. Cl.
*H04R 29/00* (2006.01)
*G01H 7/00* (2006.01)
*H04S 7/00* (2006.01)

(52) U.S. Cl.
CPC ............ *H04R 29/002* (2013.01); *G01H 7/00* (2013.01); *H04R 29/007* (2013.01); *H04S 7/305* (2013.01); *H04R 29/001* (2013.01); *H04R 2430/01* (2013.01); *H04S 2420/01* (2013.01)

(58) Field of Classification Search
CPC .. H04R 29/002; H04R 29/007; H04R 29/001; H04R 2430/01; H04S 7/305; H04S 2420/01; G01H 7/00
USPC ..................................................... 381/56, 58
See application file for complete search history.

(56) References Cited

U.S. PATENT DOCUMENTS

| | | | | |
|---|---|---|---|---|
| 6,322,521 B1 * | 11/2001 | Hou | ............. | A61B 5/121 |
| | | | | 381/23.1 |
| 7,013,011 B1 | 3/2006 | Weeks | | |
| 8,238,563 B2 * | 8/2012 | Rumsey | ............. | H04R 29/00 |
| | | | | 381/101 |
| 8,737,630 B2 | 5/2014 | Chang | | |
| 2001/0038702 A1 * | 11/2001 | Lavoie | ............. | H04S 7/301 |
| | | | | 381/307 |

(Continued)

FOREIGN PATENT DOCUMENTS

EP 2849458 A1 3/2015

OTHER PUBLICATIONS

Kotus Jozef el al. :"Creating Dynamic Psychoacoustic Maps of Hearing Threats for Outdoor Concerts Employing Supercomputing Grid" JAES, AES, Apr. 25, 2014, XP040637033.*

(Continued)

*Primary Examiner* — Ammar T Hamid
(74) *Attorney, Agent, or Firm* — Seed Intellectual Property Law Group LLP

(57) ABSTRACT

Disclosed is a method of determining in real-time an estimate of a Sound Pressure Level or Sound Exposure corresponding to sound produced in an acoustic environment by multiple loudspeakers of a sound system in response to an input signal to the sound system. The method comprises determining in real-time the estimate of the Sound Pressure Level or Sound Exposure on the basis of the input signal. The sound system is a level-calibrated sound system. Also disclosed is a real-time sound level estimator. Also disclosed are a method and a real-time sound level estimator where the estimation is based on an approximation of system properties based on microphone measurements, or established for multiple listening positions, respectively. Also disclosed are methods of calibrating and monitoring a sound system and calibration and monitoring devices therefore.

26 Claims, 18 Drawing Sheets

(Prior art)

(56) References Cited

U.S. PATENT DOCUMENTS

Figure 1:
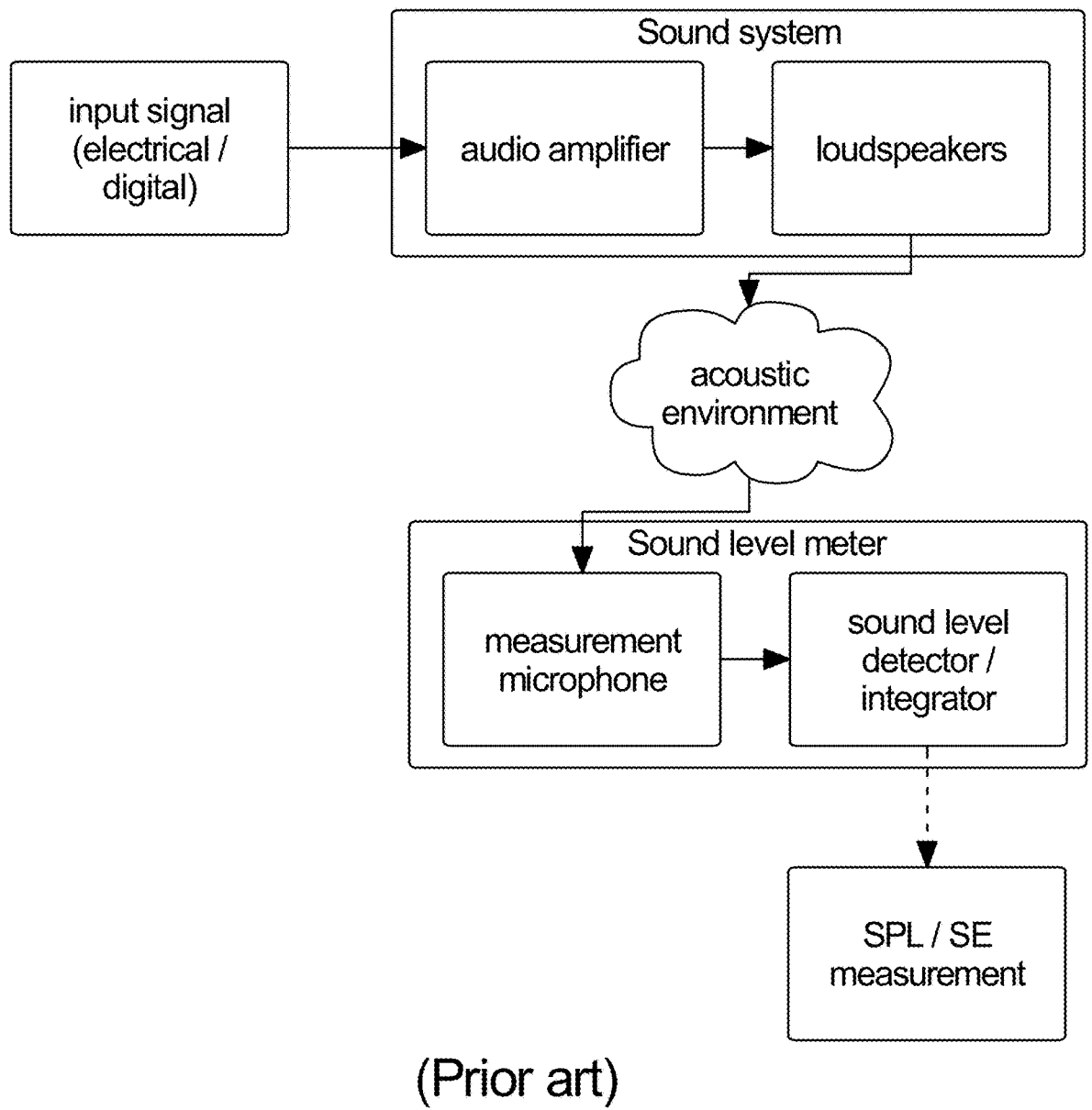

| | | | | |
|---|---|---|---|---|
| 2007/0192098 A1* | 8/2007 | Zumsteg | ................ | G10L 25/69 |
| | | | | 704/240 |
| 2009/0015594 A1* | 1/2009 | Baba | .................... | G10H 1/0008 |
| | | | | 345/619 |
| 2011/0211705 A1* | 9/2011 | Hutt | ..................... | H04R 29/001 |
| | | | | 381/59 |
| 2012/0177212 A1* | 7/2012 | Hou | ....................... | H04R 25/70 |
| | | | | 381/60 |
| 2013/0064042 A1* | 3/2013 | Aarts | ..................... | G01S 7/534 |
| | | | | 367/99 |
| 2013/0259254 A1* | 10/2013 | Xiang | .................. | G10K 11/175 |
| | | | | 381/73.1 |
| 2014/0037097 A1* | 2/2014 | LaBosco | ............ | H04R 29/001 |
| | | | | 381/59 |
| 2014/0321670 A1* | 10/2014 | Nystrom | ................ | H03G 5/165 |
| | | | | 381/107 |
| 2015/0010158 A1* | 1/2015 | Broadley | ............... | H04R 29/00 |
| | | | | 381/58 |
| 2015/0016642 A1* | 1/2015 | Walsh | .................... | H04S 7/301 |
| | | | | 381/307 |
| 2016/0134983 A1* | 5/2016 | Hansson | .................. | H04R 1/22 |
| | | | | 381/59 |
| 2017/0006394 A1* | 1/2017 | Risberg | ................. | H04R 3/002 |

OTHER PUBLICATIONS

ASHA: "Pure-Tone Testing of faintest tones a person can hear at selected pitches (frequencies), from low to high. During this test" in http://www.asha.org/public/hearing/Pure-Tone-Testing/).*

J. Acoust. Soc. Am. Jun. 1992 hereinafter J. Acoust. Soc.. (Year: 1992).*

Kotus, et al., "Creating Dynamic Psychoacoustic Maps of Hearing Threats for Outdoor Concerts Employing Supercomputing Grid" Audio Engineering Socitey, Convention e-Brief 150, Presented at the 136 Convention, Apr. 26-29, 2014, 4 pages.

* cited by examiner

SOUND LEVEL ESTIMATION

BACKGROUND

The present invention relates to estimation of sound level.

Many rooms or halls have a sound system installed, so that, for example, music or announcements can be played out to the audience or guests in the hall. Similarly, a concert venue would have a PA system installed, a movie theater would have a cinema sound reproduction system, and a studio would have its audio monitoring system.

A modern studio, cinema or home theater would have some type of surround sound system, supporting at least 5.1 or 7.1 channel sound reproduction. Bars, cafés, clubs, and discotheques would typically have a "house" sound system installed, comprising numerous loudspeakers—tens or even hundreds. In larger installations, different audio sources could be played in different zones, such that the "audience" at two different locations would hear either the same audio but at different sound levels, or different audio entirely.

In all the above cases, it is desirable to know the sound pressure level (SPL) at different positions in the acoustic environment, which the sound system covers. The SPL could be monitored, for instance to ensure that a maximum SPL is not exceeded. Or the SPL at different locations or zones could be checked against the intended SPL in each zone. Monitoring the SPL may be useful for both the owner of the venue, the arranger of the event, and the audio engineer, DJ, or operator mixing or controlling the levels of the sound sources and/or of the amplifiers powering the loudspeakers.

Figure 2:
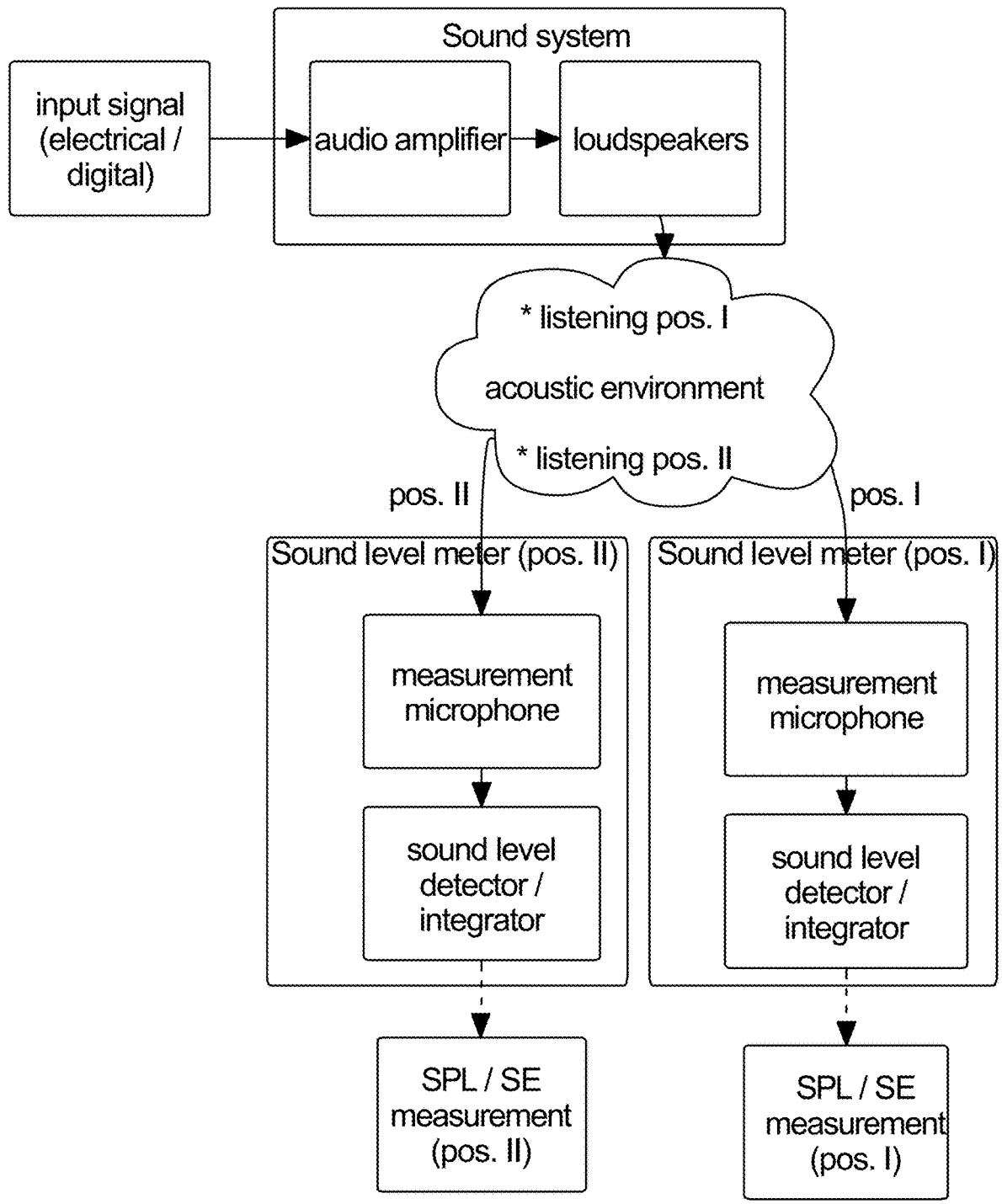

To measure the SPL, at some position, a sound level meter is normally employed (e.g. as specified in IEC 61672). Either a stand-alone device (e.g. Brüel & Kjær's Sound Level Meter—type 2250), or a measurement-microphone with omnidirectional characteristic, connected to sound level measurement software running on a PC having an audio i/o-interface with calibrated A/D converters installed. FIG. 1 illustrates a prior art embodiment where a sound level meter is employed to measure the SPL in an acoustic environment. FIG. 2 illustrates a prior art embodiment where the SPL is measured at two different listening positions. If the SPL is steady or reproducible the SPL at the listening positions may be measured sequentially by using only one sound level meter, but if the SPL needs to be monitored or maximum SPL during some period needs to be determined, then a sound level meter is required for each listening position.

A stand-alone sound level meter, often handheld or setup on a tripod, would be well-suited for "spot checks" of the SPL. But making such a device a permanent installation would be impractical—both due to the cost of purchase and maintaining the device, and due to the inconvenience of having, for example the sound level meter on a tripod installed at the center of a café or concert venue. Maintenance would include ensuring correct operation of the device, as well as calibration of sensitivity vs absolute level, at regular intervals.

Moreover, the measurements would need to be collected or downloaded onto a central storage in order to keep records of the SPL corresponding to different days or events. Having only the measurement-microphone at the location of interest and the actual sound measurement device stored somewhere else, would be another approach. In this case, the microphone and the measurement device would need to be connected by a cable carrying the audio signal and usually "phantom power" to the microphone.

In a real acoustic environment, i.e. with furniture and reflective surfaces of different materials, the combined effect of the multiple loudspeakers would mean that the resulting SPL, as well as coloration of the sound, could vary considerably between different locations. Hence, multiple sound level meters would be required—one for each measurement location—each with its own measurement microphone, hence suffering from the same problems as a single location, only multiplied.

When measuring the SPL, several different measures may be of interest: The peak SPL would reflect the maximum instantaneous acoustical level. Furthermore, the SPL may be averaged over the most recent (say) 15 minutes time period, and reported as an $L_{eq}$, "equivalent continuous sound level", often A or C frequency weighted. Regional authorities may limit the maximum permitted $L_{eq}$ over one or more time periods, for public events.

The integrated sound pressure is generally known as Sound Exposure, and may further be A-weighted and calculated for a normalized 8 hour working day (ISO 1999; IEC 61252). Such measures are employed in regulations by national and international authorities to control and limit noise-induced hearing loss (NIHL), especially related to noise (including music) in the workspace. A recent example is: Directive 2003/10/EC of the European Parliament and of the Council of 6 Feb. 2003 on the minimum health and safety requirements regarding the exposure of workers to the risks arising from physical agents (noise).

Figure 3:
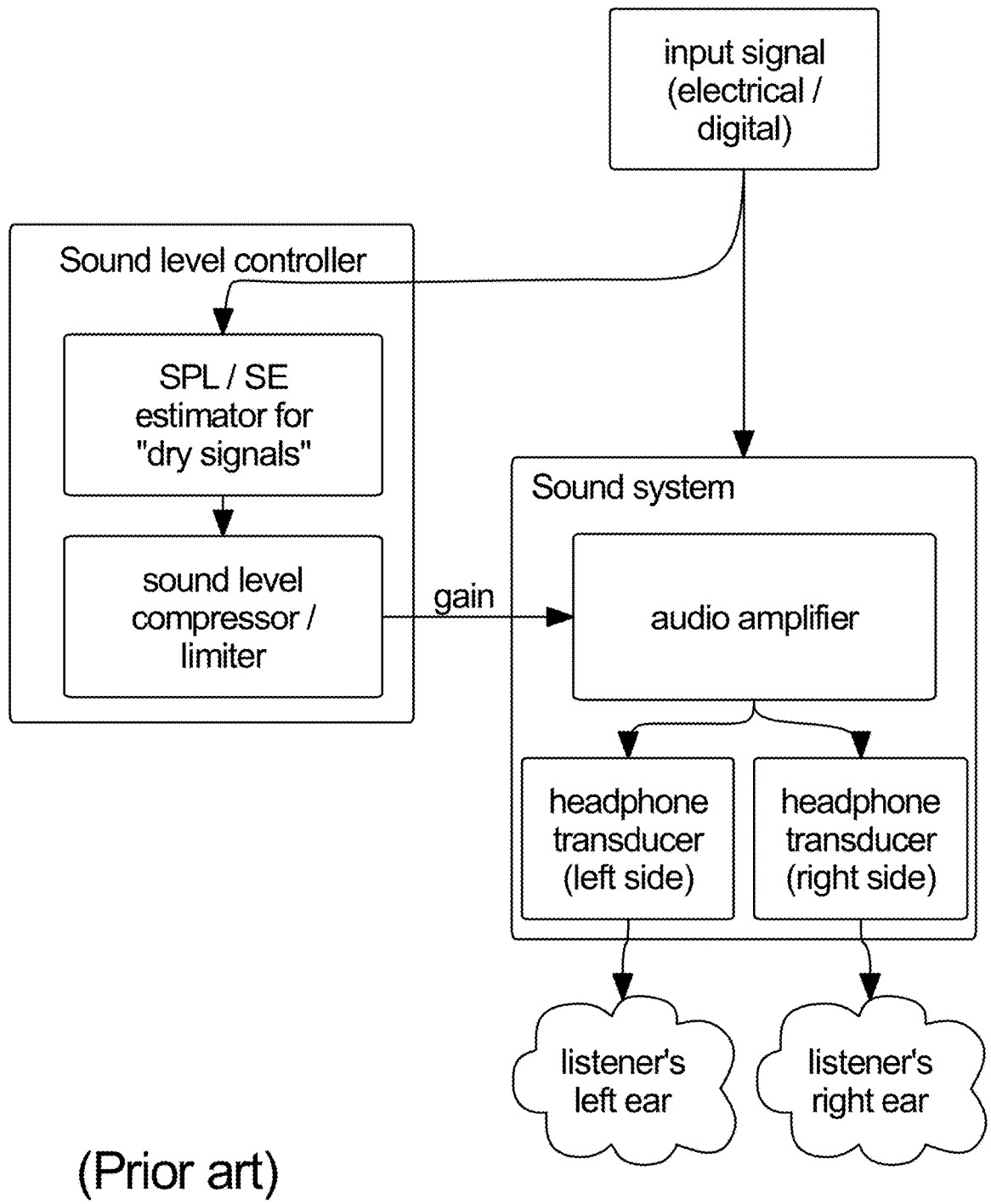

Some prior art methods exist for estimating and limiting e.g. the SPL that the user of a certain headset or personal media player would be exposed to. They are based on prior knowledge of technical characteristics, such as sensitivity of the amplifier and/or transducer in the specific device. Often they employ rather crude means, such as simply limiting the voltage of the output signal or limiting the amplification gain of the device. These procedures do not directly correspond to controlling or limiting the actual Sound Exposure. FIG. 3 illustrates a prior art personal sound system with sound level control, where an SPL/SE estimator uses knowledge about the audio amplifier and the headphone transducers to control the SPL based on the fact that the sound will be delivered right into the user's ears and not interact with a more open acoustic space.

U.S. Pat. No. 8,737,630 discloses a system for estimating the sound exposure to reduce risk of noise induced hearing loss when listening to music through earphones or headphones. The estimation may be based on microphone measurements in the earphone or measurements of the audio signal before or after the amplifier. U.S. Pat. No. 7,013,011 discloses a system for limiting the possible sound pressure level which a user may experience from a telephone headset. The system uses a predetermined transfer function including the amplifier, headset and ear coupling characteristic to estimate the SPL which the input audio signal will cause, and attenuates the input audio signal if the estimated SPL is above a threshold.

A problem with the prior art methods is that they are bound to the specific device, for instance, a certain MP3-player or a certain headset. Furthermore, a most severe limitation is that these prior art methods cannot be applied to loudspeakers in an acoustic environment, because they are based on the assumption that the transducer (e.g. headset or in-ear headphone) is "coupled directly" with the ear of the user/listener. This is even more limiting when considering acoustic environments with multiple loudspeakers interacting in producing varying sound levels at different positions, as opposed to the headphone environments with basically one loudspeaker per ear.

Other prior art devices exist for measuring the Sound Exposure that one person is exposed to, typically during a working day; such a device may be known as a Personal Noise Dosimeter. These devices are self-contained and portable, and must be "worn" the whole time by the user, typically on his or her shoulder. Each device would contain a microphone used to continually measure the noise or sound level, to which the user is exposed, and then accumulate and display the "dose". If the dose would exceed a certain limit, the device could issue a warning, and the user might for example be encouraged to wear hearing protection.

Three principal limitations of such devices are: 1) the initial cost, 2) the maintenance (e.g. calibration and recharging), and 3) the discipline required for each person to always possess and wear the dosimeter.

SUMMARY

The inventor, having identified the above-described disadvantages of the prior art, has invented new and useful methods and arrangements for estimating acoustic properties such as for example Sound Pressure Level or Sound Exposure. Various embodiments of the invention may for example facilitate such estimations without requiring a sound level meter or dosimeter or microphone placed at the position of interest. Various embodiments of the invention may for example facilitate such estimations at several positions of interest without requiring several sound level meters or dosimeters or microphones. Various embodiments of the invention may for example facilitate such estimations for sound produced in an acoustic environment by multiple loudspeakers.

In an aspect the present invention relates to a method of determining in real-time an estimate of a Sound Pressure Level or Sound Exposure corresponding to sound produced in an acoustic environment by multiple loudspeakers of a sound system in response to an input signal to said sound system, the method comprising determining in real-time said estimate of the Sound Pressure Level or Sound Exposure on the basis of the input signal; wherein the sound system is a level-calibrated sound system.

It is often desirable to know the resulting Sound Pressure Level or Sound Exposure when multiple loudspeakers are playing sound into an acoustic environment. Embodiments of the present invention advantageously estimates Sound Pressure Level, Sound Exposure or related measures—without employing a microphone to measure the sound that was played.

By the present invention, several of the problems related to having a measurement microphone installed, e.g. its cost, power-supply, maintenance, cabling, interference with architectural aesthetics and the audience, are effectively resolved. According to the present invention this is achieved by using the input signal to the sound system for determining the estimate instead of relying on a measurement microphone. Thereby various embodiments of the present invention are non-interfering, do not occupy space in the acoustic environment, and may be completely invisible from the people or audience present in the acoustic environment.

A surprising effect of the present invention is that SPL or Sound Exposure measurement and control could be employed in places where installing and maintaining a (calibrated) measurement-microphone would be infeasible or impracticable due to cost, architecture, aesthetics, hygiene, dust, audience space, etc.

Another surprising effect of the present invention is that the SPL or Sound Exposure estimate is independent of secondary sound sources, such as ambience, background noise, audience etc. This could correspond well with official regulations, which may also concern the sound produced by the "house", whereas the organizer or owner of the establishment could not be held responsible for the noise generated by the audience or guests.

The estimates are determined in real-time, such that the "current" or instantaneous SPL can be continuously estimated. Furthermore, an averaged or integrated measure, such as an $L_{eq}$ or Sound Exposure Level, can be estimated—typically covering the sound produced for a fixed duration (e.g. 15 min or 8 hrs), or the duration of an event (e.g. a concert). By real-time is understood: the input-signal is received and/or processed continuously, as it comes in—that is, without having access to "future" parts of the input signal. The estimates of Sound Pressure Level or Sound Exposure may be updated regularly or on demand, and the estimates will be based on the input-signal received "so far" (or part thereof). The display of estimates is not necessarily in real-time but could, for instance, happen after the completion of some event, for example a concert, a working day, or a session.

By Sound Pressure Level is understood any instantaneous, peak, or time-weighted sound pressure, sound intensity or sound pressure level (e.g. $L_{AF}$, $L_{Cpk}$), and by Sound Exposure is understood any integrated or averaged sound pressure or sound (pressure) level (e.g. $L_{eq}$, $L_{avg}$, E, SEL, Dose, or TWA), as appreciated by a person skilled in the art of acoustics.

The estimates calculated according to the present invention are based on the input signal to the sound system, which may consist of one or many audio channels. By input signal is understood the typically electrical or optical representation of the input audio signal, in any analog or digital encoding. The source of this input signal may be for example a playback of a recording, a mix of other sources, or a recording of a live event. The estimations may be calculated by a processor integrated in the sound system, or by an external device to which the input signal is provided. The input signal may in various embodiments be tapped at various nodes of the sound system, e.g. at its input, after any preprocessing, e.g. decoding, preamplification, normalization, equalization or other filtering, after application of a user-defined gain or "volume"-setting, before or after power amplification, or even at the power outputs for the loudspeakers, etc.

An embodiment of the invention relies on the sound system being level-calibrated. This prerequisite may be achieved, for example, at the time of installing the sound system, or prior to some event taking place. Using a sound system which is level-calibrated in the actual acoustic environment is advantageous in order to obtain a more accurate estimate.

The level-calibration may relate to a single position in the acoustic environment, such as the primary listening-position. Alternatively, the level-calibration may relate to a certain area or to multiple positions—in this case, the level-calibration could be performed by averaging over multiple individual positions. Consequently, the estimate of SPL or Sound Exposure would normally be most accurate for the position(s) for which the sound system had been calibrated.

By an acoustic environment is understood any studio, room, hall, theatre, or outdoors space with a volume large enough that each ear, of a person in that acoustic environment, can receive sound from more than one of the loudspeakers. Hence by "loudspeakers in an acoustic environment" we exclude e.g. headphones and mobile phone transducers held against one ear.

In an advantageous embodiment the method comprises calculating an inter-channel correlation of one or more pairs of channels of said input signal, and further improving said estimate of a Sound Pressure Level or Sound Exposure by using said calculated inter-channel correlation in said determining in real-time said estimate of the Sound Pressure Level or Sound Exposure.

Generally the input signal to a sound system, containing multiple loudspeakers, will be a multi-channel signal (e.g. consisting of 2, 5, or even 22 channels). The signals in any pair of the channels may be correlated to some degree; in the extreme case the signals are identical, equivalent to a constant correlation of 1.0. More realistically, the correlation will fluctuate between 0.0 and 1.0, but sometimes also negative correlation may occur, depending on the mix, format, and genre of the source feeding the input signal.

The time-varying inter-channel correlation plays a role in the acoustic summation of any pair of loudspeaker channels. Due to the superposition of the (pair of) sound waves, the SPL of the acoustic may be up to 6 dB greater than the SPL of one of the sound channels, i.e. constructive interference of two identical sounds. On the other hand, the sounds may be "uncorrelated", in which case the resulting SPL of the sum of the two sounds would be only 3 dB greater.

Thus, by calculating the inter-channel correlation directly from the input signal, the accuracy of the estimated SPL or Sound Exposure can be improved, by continually employing the appropriate sum of the contributions from the different channels. The more channels, the greater the effect of the inter-channel correlation is potentially: For 3 channels, the effect is up to 4.8 dB; for 4 channels, 6.0 dB; for 5 channels, 7.0 dB; and for 6 channels, 7.8 dB. These figures consider only inter-channel correlations between 0 and 1.

In an advantageous embodiment the method comprises providing a pre-determined diffuseness of the acoustic environment, and further improving said estimate of a Sound Pressure Level or Sound Exposure by using said calculated inter-channel correlation and said diffuseness of the acoustic environment in said determining in real-time said estimate of the Sound Pressure Level or Sound Exposure.

The degree to which the inter-channel correlation affects the resulting SPL depends on the diffuseness of the acoustic environment. If the environment is extremely "damped", such as an anechoic chamber, the varying inter-channel correlation will have the maximum effect. In contrast, if the acoustic environment is very reverberant, known as a "diffuse field", the effect that the inter-channel correlation should be given on the SPL estimate should be only small.

The actual diffuseness of the acoustic environment could be pre-determined by microphone measurement in the actual acoustic environment (e.g. while calibrating the sound system), or looked-up, guessed, or selected from a list (e.g. "small reverberant room", "medium damped hall" etc.).

In an advantageous embodiment the method comprises approximation of a frequency response of one or more of the multiple loudspeakers in the acoustic environment, and further improving said estimate of a Sound Pressure Level or Sound Exposure by using said approximation of a frequency response in said determining in real-time said estimate of the Sound Pressure Level or Sound Exposure.

Preferably, a filter is used to approximate the frequency response of an individual loudspeaker in the acoustic environment. Such a filter would simulate the "coloring" of the sound caused by the loudspeaker and by the room, in combination. Even professional sound systems typically do not have a completely flat frequency response. Hence, the accuracy of the SPL estimate would be improved by applying the filter to the "uncolored" input signal, preferably as a first step in determining the estimate.

A different filter may preferably be applied for each loudspeaker, even though they are the same type and model, due to the influence of, for instance, their placement in the room. The filter could be designed to match a smoothed (i.e. "undetailed") amplitude response curve, only approximating the real frequency response. Hence the filter could be implemented by an IIR filter of relatively low order, i.e. computationally simple. Such an approximation could still be effective, because the fine details of the real frequency response would normally have relatively little influence on the SPL of broad-band signals, such as music.

The actual per-loudspeaker frequency response may be measured by means of functionality that is part of an embodiment of the present invention, as an initial step. Or it may be measured externally, e.g. by the installer of the sound system while he is calibrating it, and then transferred to an embodiment of the present invention. As other means of providing the approximation could be used pre-defined templates of typical frequency responses, or theoretic models of the acoustic environment.

In an advantageous embodiment the method comprises approximation of a reverberation characteristic of the acoustic environment, and further improving said estimate of a Sound Pressure Level or Sound Exposure by using said approximation of a reverberation characteristic in said determining in real-time said estimate of the Sound Pressure Level or Sound Exposure.

The reverberation properties of an acoustic environment may in various embodiments be characterized by a single number, commonly the reverberation time (e.g. $R_{T60}$), or characterized in more detail, such as the Energy Time Curve (ETC) per octave. In a reverberant room or hall, the estimate of some SPL measures could be improved by simulating the effect of the reverberation on the input signal. Because the actual "input signal plus reverberation" is not required, but only its resulting SPL, a basic approximation of the reverberant characteristics may be used. For example, an exponential decay could be imposed on the RMS-envelope (as part of computing the SPL estimate), with a decay slope corresponding to the, e.g., $R_{T60}$ of the room.

A particularly advantageous embodiment is obtained when approximation of the reverberation characteristics is applied in determining estimates of instantaneous or maximum SPL. The basic reverberation characteristics of the actual acoustic environment may be deduced from the room dimensions and equivalent absorption surface (e.g. the Sabine method); or they could be calculated (in more detail), based on a measured impulse response of the room. As other means of providing the approximation could be used pre-defined templates of typical reverberant halls or rooms, or theoretic models of the acoustic environment.

In an advantageous embodiment the method comprises providing one or more properties of said sound system related to multiple pre-determined different listening-positions, and determining said estimate of a Sound Pressure Level or Sound Exposure for one or more of said multiple pre-determined different listening-positions by using said properties of said sound system.

The acoustical mix of the multiple loudspeakers would generally be different for different listening-positions in a room or hall, partly due to the different distances to the individual loudspeakers, and partly due to the different contributions from reflections etc. of the acoustic environment. According to an embodiment of the present invention, the estimate of SPL and Sound Exposure could therefore be improved by taking into account one or more properties of the sound system, determined at different listening-positions. Such properties, determined at different listening-positions, could be simply the relative level of each loudspeaker. Used in combination with calculating the inter-channel correlation, the delay to the individual loudspeaker would be relevant, as it affects the superposition of their sound waves. Particularly advantageous, an approximation of the frequency response could be determined for multiple listening-positions.

A concert hall or an outdoor music venue, for example, may comprise a number of positions of special interest, e.g. in front of the stage, at the sound mixer, at the bar, or even in the room next door. Listening-position may refer to any spatial position at which the sound from one or more of the multiple loudspeakers may, possibly theoretically, be recognized, and does not necessarily refer to a position intended for listening to the sound. Rather, listening-positions for which knowledge about, e.g., the SPL or Sound Exposure may be desired or relevant may typically be average or distributed positions among an audience, positions where people work or stay or live regardless of the sound being intended for them or not, positions where people may accidentally be exposed to the sound unintended or unknowingly, theoretical positions defined in a standard or regulation or recommendation or contract such as 1.2 meters or 4 feet above the floor, etc.

A surprising effect of this embodiment of the present invention is that individual estimates of SPL and Sound Exposure can be produced for multiple listening-positions or typical "audience locations", costing only extra computation and preferably initial calibration; no extra microphones and hardware installation, cabling etc. is required. In other words, the present embodiment features superior scalability. The multiple estimates may be used simultaneously or alternatingly.

In an advantageous embodiment the method comprises approximation of a transfer function between each pair of one of the multiple loudspeakers and a pre-determined listening-position in said acoustic environment, and further improving said estimate of a Sound Pressure Level or Sound Exposure by using said approximation of a transfer function in said determining in real-time said estimate of the Sound Pressure Level or Sound Exposure.

A transfer function could be determined for each pair of loudspeaker and listening-position; in other words, for N loudspeakers and M pre-determined listening-positions, N·M transfer functions. The transfer function may be in the form of e.g. a complex frequency response or an impulse response. For each listening-position, each channel of the input signal may be processed by a filter implementing the transfer function for the corresponding loudspeaker (i.e. convolution). An improved estimate of SPL or Sound Exposure could be determined, by performing this processing, preferably as a first step, in determining said estimate.

Advantageous of this embodiment is that it essentially considers the combined effects of the frequency response, the inter-channel correlation, and the reverberation (all described above), though also causes a relatively high computational complexity caused by the length of each impulse response of possibly several 100,000 points.

In an advantageous embodiment the method comprises attenuating said sound produced based on said estimate of Sound Pressure Level or Sound Exposure, in order for the estimated Sound Pressure Level or Sound Exposure to not exceed a pre-determined threshold.

It may be desirable for the SPL or Sound Exposure to stay below a certain maximum level, for instance to fulfill official requirements or to protect against noise-induced hearing loss. An embodiment of the present invention contains a level control, by which the input signal to the sound system can be attenuated and/or dynamically compressed before it is played by the loudspeakers. The level control attenuates the signal just enough so that the SPL or SE estimate stays within the specified maximum limit(s). This embodiment may advantageously be combined with estimating the SPL or Sound Exposure in multiple pre-determined listening positions.

In an aspect the present invention relates to a real-time sound level estimator for real-time estimation of Sound Pressure Level or Sound Exposure corresponding to sound produced in an acoustic environment by multiple loudspeakers of a level-calibrated sound system in response to an input signal to said sound system, the sound level estimator comprising an input signal input for receiving the input signal; a processor; a memory accessible by the processor, the memory storing instructions for the processor and level-calibration information about the sound system; and an estimate output for providing the estimate; wherein the processor is arranged to receive the input signal from the input signal input, simulate a sound level of said sound produced in the acoustic environment and calculate said estimate of Sound Pressure Level or Sound Exposure and provide it at the estimate output; wherein the simulation of a sound level is based on the input signal and the level-calibration information.

A real-time sound level estimator according to embodiments of the invention is highly beneficial as it allows for estimation of e.g. Sound Pressure Level, Sound Exposure or related measures—without employing a microphone to measure the sound that was played. Thereby several problems related to having measurement microphones installed or temporarily applying measurement microphones, are avoided. The real-time sound level estimator may preferably be configured to perform the method of determining in real-time an estimate of a Sound Pressure Level or Sound Exposure described above, and may advantageously be modified with any of the features mentioned above regarding that method.

In an aspect the present invention relates to a method of determining in real-time an estimate of a Sound Pressure Level or Sound Exposure corresponding to sound produced in an acoustic environment by multiple loudspeakers of a sound system in response to an input signal to said sound system, the method comprising determining in real-time said estimate of the Sound Pressure Level or Sound Exposure on the basis of the input signal and an approximation of one or more system properties of said sound system with loudspeakers in said acoustic environment; wherein said approximation is based on microphone measurement.

An embodiment of the invention relies on the sound level estimator using an approximation of one or more system properties to calculate the sound level estimate from the input signal. The system properties may relate to properties of the sound system, the acoustic environment or combinations thereof, for example a transfer function or frequency response of the loudspeakers or, preferably, the loudspeakers in the particular acoustic environment, information about the location of the loudspeakers, delays, how they interact with the room at different frequencies, room characteristics such as reverberation or diffuseness.

According to this embodiment, the approximation of system properties is based on microphone measurements to improve the reliability of the approximations. However, whereas a microphone is advantageously used during setup and calibration of the sound system to determine the approximations of system properties, it is according to the invention not needed during normal operation for calculation of the estimate of Sound Pressure Level and/or Sound Exposure, because the present invention advantageously bases the estimation on the input signal. During establishment of the system properties with input from a microphone, a carefully designed test signal, e.g. a multi-channel test as described below, may preferably be applied to the sound system, e.g. from the sound level estimator itself.

In an advantageous embodiment said approximation of one or more system properties is pre-determined.

By pre-determined is understood: established prior to determining said estimate of SPL or Sound Exposure. Thereby is achieved according to the invention that the microphone is not needed during normal operations but only for calibration purposes.

In an advantageous embodiment said approximation of one or more system properties comprises a representation of a relation between an acoustic output level and an electrical or digital input level of said sound system.

The relation may for example be a ratio of a level of the produced sound to a level of the input signal, where the produced sound is measured by the microphone, and the input signal level is measured from the input signal. The relation may preferably be approximated on the basis of microphone measurements of certain test signals designed for this purpose, such as for example band-limited pink noise.

In an advantageous embodiment said approximations of one or more system properties comprise approximations of frequency response of one or more of the multiple loudspeakers in the acoustic environment.

In an advantageous embodiment said approximations of one or more system properties comprise approximations of reverberation characteristic of the acoustic environment.

In an advantageous embodiment said approximations of one or more system properties relate to multiple pre-determined different listening-positions.

In an advantageous embodiment said approximations of one or more system properties comprise a transfer function between each pair of one of the multiple loudspeakers and a pre-determined listening-position in said acoustic environment.

In an advantageous embodiment the method comprises calculating an inter-channel correlation of one or more pairs of channels of said input signal, and further improving said estimate of a Sound Pressure Level or Sound Exposure by using said calculated inter-channel correlation in said determining in real-time said estimate of the Sound Pressure Level or Sound Exposure.

In an advantageous embodiment the method comprises attenuating said sound produced based on said estimate of Sound Pressure Level or Sound Exposure, in order for the estimated Sound Pressure Level or Sound Exposure to not exceed a pre-determined threshold.

In an aspect the present invention relates to a real-time sound level estimator for real-time estimation of Sound Pressure Level or Sound Exposure corresponding to sound produced in an acoustic environment by multiple loudspeakers of a sound system in response to an input signal to said sound system, the sound level estimator comprising an input signal input for receiving the input signal; a processor; a memory accessible by the processor, the memory storing instructions for the processor and an approximation of one or more system properties of said sound system with loudspeakers in said acoustic environment; and an estimate output for providing the estimate; wherein the processor is arranged to receive the input signal from the input signal input, simulate a sound level of said sound produced in the acoustic environment and calculate said estimate of Sound Pressure Level or Sound Exposure and provide it at the estimate output; wherein the simulation of a sound level is based on the input signal and the approximation of one or more system properties; and wherein the approximation of one or more system properties is based on microphone measurement.

A real-time sound level estimator according to embodiments of the invention is highly beneficial as it allows for estimation of e.g. Sound Pressure Level, Sound Exposure or related measures—without employing a microphone during normal operation to measure the sound that was played. Thereby several problems related to having measurement microphones installed are avoided. The real-time sound level estimator may preferably be configured to perform the method of determining in real-time an estimate of a Sound Pressure Level or Sound Exposure described above, and may advantageously be modified with any of the features mentioned above regarding that method.

In an aspect the present invention relates to a method of calibrating and monitoring a sound system comprising multiple loudspeakers for producing sound in an acoustic environment in response to an input signal to said sound system, the method comprising: approximating one or more system properties of said sound system in the acoustic environment, the approximating being based on measurements in the acoustic environment using a microphone; and determining in real-time, based on said approximation and said input signal and not on a microphone measurement of said produced sound, an estimate of an acoustic property of said produced sound.

According to this aspect, the invention is highly beneficial as it allows for a two-step estimation of acoustic properties of produced sound, e.g. Sound Pressure Level, Sound Exposure, speech intelligibility, clarity or other acoustic properties, where a microphone is only used during the first step of calibrating the sound system. The first step may be a one-time event, or may be carried out regularly, but in any scenario, the device allows for estimating the produced acoustic properties without requiring a microphone during the monitoring phase. Thereby several problems related to having measurement microphones installed are avoided.

By calibrating the sound system is understood: measuring one or more electro-acoustic properties and verifying and/or adjusting parameters of the sound system, for example amplification gains, equalizer levels, crossover-filter frequencies, channel delays, or even the physical position of the loudspeakers.

By monitoring the sound system is understood: estimating acoustic properties of sound produced by the sound system, and displaying, logging, or checking the ranges of one or more acoustic properties In an advantageous embodiment said estimate of an acoustic property comprises instantaneous or averaged Sound Pressure or Sound Pressure Level, and/or integrated Sound Pressure, Sound Exposure, or Sound Exposure Level.

In an advantageous embodiment said estimate of an acoustic property comprises speech intelligibility, which may be desirable to monitor in certain scenarios where speech is a significant part of the sound produced, e.g. in announcement systems, conference systems, speech studios, etc.

In advantageous embodiments said estimate of an acoustic property comprises Speech Transmission Index, STI, or Common Intelligibility Scale, CIS, i.e. measures of the capability of the sound system and acoustic environment in full or part to render intelligible speech.

In an advantageous embodiment said estimate of an acoustic property comprises Clarity, for example in the form of the "direct-to-reverberant ratio" or "early to late arriving sound energy ratio", e.g. an estimate of the C50-measure.

In an advantageous embodiment said approximating one or more system properties comprises determining a representation of a relation between an acoustic output level and an electrical or digital input level of said sound system.

In an advantageous embodiment said determining comprises calculating an inter-channel correlation of one or more pairs of channels of said input signal, and further improving said estimate of the acoustic property by using said calculated inter-channel correlation in said determining in real-time said estimate.

In an advantageous embodiment said one or more system properties being approximated comprise a frequency response of one or more of the multiple loudspeakers in the acoustic environment, a reverberation characteristic of the acoustic environment, and/or a transfer function between each pair of one of the multiple loudspeakers and a pre-determined listening-position in said acoustic environment, and wherein said determining comprises improving said estimate of the acoustic property by using said approximated system properties in said determining in real-time said estimate.

In an advantageous embodiment said approximating comprises approximating said system properties with respect to multiple pre-determined different listening-positions, and wherein said determining comprises determining said acoustic property for one or more of said multiple pre-determined different listening-positions by using said sound system properties.

In an advantageous embodiment the method comprises attenuating said sound produced based on said estimate of an acoustic property, in order for the acoustic property to not exceed a pre-determined threshold.

In an aspect the present invention relates to a calibration and monitoring device for calibrating and monitoring a sound system comprising multiple loudspeakers for producing sound in an acoustic environment in response to an input signal to said sound system; the calibration and monitoring device comprising: a calibrator comprising a microphone signal input; a real-time sound level estimator comprising an input signal input and an estimate output; a processor arranged to perform processing of the calibrator and the real-time sound level estimator; and a memory accessible by the processor, the memory storing instructions for the processor and an approximation of one or more system properties of said sound system with loudspeakers in said acoustic environment; wherein the calibrator is arranged to determine and store in the memory the approximation of one or more system properties on the basis of microphone measurements in the acoustic environment received at the microphone signal input; and wherein the real-time sound level estimator is arranged to receive an input signal from the input signal input, simulate a sound level of said sound produced in the acoustic environment and calculate an estimate of an acoustic property of said produced sound and provide the estimate at the estimate output; wherein the simulation of a sound level is based on the input signal and the approximation of one or more system properties and not based on a microphone measurement of said produced sound.

A calibration and monitoring device according to embodiments of the invention is highly beneficial as it allows for a two-step estimation of acoustic properties of produced sound, e.g. Sound Pressure Level, Sound Exposure, speech intelligibility, clarity or other acoustic properties, where a microphone is only used during the first step of calibrating the sound system. The first step may be a one-time event, or may be carried out regularly, but in any scenario, the device allows for estimating the produced acoustic properties without requiring a microphone during the monitoring phase. Thereby several problems related to having measurement microphones installed are avoided. The calibration and monitoring device may preferably be configured to perform the method of calibrating and monitoring a sound system described above, and may advantageously be modified with any of the features mentioned above regarding that method.

In an aspect the present invention relates to a method of calibrating a sound system comprising multiple loudspeakers for producing sound in an acoustic environment in response to an input signal to said sound system, the method comprising: providing as the input signal a multi-channel test signal having different spectral content for channels corresponding to different of said multiple loudspeakers; measuring one or more system properties of said sound system in the acoustic environment; and calibrating the sound system based on said measured system properties.

By calibrating the sound system is understood measuring one or more electro-acoustic properties and then adjusting parameters of the sound system, thereby optimizing the measurable properties. This process may take place iteratively, making incremental improvements. Another kind of calibration is verifying parameters of the sound system—basically making sure that the system is in a calibrated state. The initial calibration, and major re-calibration, of a sound system may be performed quite rarely, but a verification procedure, on the other hand, may be performed regularly and often (e.g. daily). In this case, the present invention is particularly advantageous because the procedure can be parallelized and hence performed quickly.

The parameters of the sound system may be for example amplification gains, equalizer levels, crossover-filter frequencies, channel delays, or even the physical position of the loudspeakers.

By spectral content (of the test signal) is understood frequency-domain content of the signal, i.e. the power per frequency-interval. Spectral content is considered different for two channels when the frequency spectrum of one channel, for some time period, differs significantly from the frequency spectrum of the other channel, for the same time period.

By a multi-channel signal is understood one signal channel per loudspeaker, where a loudspeaker may naturally contain multiple transducers, stacked or grouped units etc. The use of a multi-channel signal for calibration does not apply only to surround sound systems or the like, but simply requires two or more loudspeakers to be individually addressable by audio signals, e.g. by discrete output channels to each loudspeaker or by network-, bus-, or multiplexed loudspeaker operation or the like. The multi-channel signal may preferably comprise said different spectral content in two or more, preferably all, channels simultaneously, so that two or more, preferably all, of the multiple loudspeakers produce the test signal simultaneously. The measuring thereby consists of making a single measurement while, preferably, all loudspeakers produce sound at the same time. The measurement may preferably be performed by a microphone. When calibration is desired at multiple listening-positions, various embodiments of the invention may comprise measuring by several microphones at several listening positions simultaneously, or measuring with one microphone sequentially at each listening-position while the test-signal is repeated by the multiple loudspeakers simultaneously.

In an advantageous embodiment each channel of said multi-channel test signal comprises multiple pure tones distributed across a frequency interval corresponding to an intended frequency interval of the measurement, and where a frequency density of said pure tones corresponds to an intended frequency resolution of the measurement.

In an advantageous embodiment said multi-channel test signal comprises multiple pure tones with frequencies such that no tone is a harmonic of any lower tone.

In an advantageous embodiment said multi-channel test signal comprises noise signals which are band-limited such that the spectral overlap of a noise signal in a first channel, with the noise signal of a second channel, does not contribute significantly to said measured system properties of a second channel.

In an advantageous embodiment said measuring one or more system properties comprises determining a representation of a relation between an acoustic output level and an electrical or digital input level of said sound system.

In an advantageous embodiment said one or more system properties being determined comprise a frequency response of one or more of the multiple loudspeakers in the acoustic environment, a reverberation characteristic of the acoustic environment, and/or a transfer function between each pair of one of the multiple loudspeakers and a pre-determined listening-position in said acoustic environment.

In an advantageous embodiment said measuring one or more system properties comprises measuring said system properties with respect to multiple pre-determined different listening-positions, and wherein said calibrating comprises calibrating the sound system for one or more of said multiple pre-determined different listening-positions based on said measured system properties.

In an aspect the present invention relates to a calibration device for calibrating a sound system comprising multiple loudspeakers for producing sound in an acoustic environment in response to a test signal to said sound system; the calibration device comprising: a test signal output; a microphone signal input; a processor; and a memory accessible by the processor, the memory storing instructions for the processor, parameters for a multi-channel test signal and system properties and calibration information of the sound system; wherein the processor is arranged to establish a multi-channel test signal at the test signal output; to determine and store in the memory the system properties on the basis of microphone measurements in the acoustic environment received at the microphone signal input; and to determine and store in the memory the calibration information of the sound system on the basis of the system properties.

A calibration device according to embodiments of the invention is highly beneficial as it allows for easy and fast calibration, and in particular, verification, of sound systems with regard to electro-acoustic properties. The calibration device may in embodiments be remarkably fast to use, as it may process two or more loudspeakers simultaneously due to the multi-channel test signal having different spectral content. The calibration device may preferably be configured to perform the method of calibrating a sound system described above, and may advantageously be modified with any of the features mentioned above regarding that method.

In an aspect the present invention relates to a method of determining in real-time an estimate of a Sound Pressure Level or Sound Exposure corresponding to sound produced in an acoustic environment by multiple loudspeakers of a sound system in response to an input signal to said sound system; the method comprising determining in real-time said estimate at multiple pre-determined listening-positions in said acoustic environment, on the basis of the input signal.

Thereby is beneficially allowed for estimation of e.g. Sound Pressure Level, Sound Exposure or related measures at multiple listening positions simultaneously—without employing a microphone to measure the sound that was played. This method may thereby dramatically simplify the measuring and monitoring of sound levels in environments where levels at several listening positions are of interest. Often in such environments, the installation of measurement microphones for traditional level measurements is highly undesired, and may be avoided completely by employing this aspect of the present invention.

In an advantageous embodiment said sound system is a level-calibrated sound system.

In an advantageous embodiment said estimate is determined further on the basis of an approximation of one or more system properties of said sound system with loudspeakers in said acoustic environment.

It is noted, that the system properties may be approximated for each of the pre-determined listening positions or they may represent averages or general approximations common to two or more or all the listening positions. In an embodiment some system properties are determined for each of the multiple listening positions, and other system properties are general assumptions or averages for, e.g., an entire room. In an example embodiment, a relation between an acoustic output level and an electrical or digital input level of the sound system is measured for each desired listening positions, whereas the room's reverberation characteristic is approximated by a parameter applied commonly to the estimation for all listening positions.

In an advantageous embodiment said approximation of system properties is based on microphone measurement.

In an advantageous embodiment said approximation of system properties is pre-determined.

In an advantageous embodiment said approximations of one or more system properties relate to said multiple pre-determined listening-positions.

In an advantageous embodiment said system properties comprise a representation of a relation between an acoustic output level and an electrical or digital input level of said sound system.

In an advantageous embodiment said one or more system properties comprise a frequency response of one or more of the multiple loudspeakers in the acoustic environment, a reverberation characteristic of the acoustic environment, and/or a transfer function between each pair of one of the multiple loudspeakers and a pre-determined listening-position in said acoustic environment.

In an advantageous embodiment the method comprises calculating an inter-channel correlation of one or more pairs of channels of said input signal, and further improving said estimate of a Sound Pressure Level or Sound Exposure by using said calculated inter-channel correlation in said determining in real-time said estimate of the Sound Pressure Level or Sound Exposure.

In an advantageous embodiment the method comprises attenuating said sound produced based on said estimate of Sound Pressure Level or Sound Exposure, in order for the estimated Sound Pressure Level or Sound Exposure to not exceed a pre-determined threshold at one or more said multiple pre-determined listening positions.

In an aspect the present invention relates to a real-time sound level estimator for real-time estimation of Sound Pressure Level or Sound Exposure corresponding to sound produced in an acoustic environment by multiple loudspeakers of a sound system in response to an input signal to said sound system, the sound level estimator comprising an input signal input for receiving the input signal; a processor; a memory accessible by the processor, the memory storing instructions for the processor and listening-positions information comprising information about multiple pre-determined listening-positions in said acoustic environment; and an estimate output for providing the estimate; wherein the processor is arranged to receive the input signal from the input signal input, simulate a sound level of said sound produced in the acoustic environment and calculate said estimate of Sound Pressure Level or Sound Exposure and provide it at the estimate output; wherein the simulation of a sound level is based on the input signal and is performed for the multiple pre-determined listening-positions in said acoustic environment.

A real-time sound level estimator according to embodiments of the invention is highly beneficial as it allows for estimation of e.g. Sound Pressure Level, Sound Exposure or related measures at multiple listening positions simultaneously—without employing a microphone to measure the sound that was played. This estimator may thereby dramatically simplify the measuring and monitoring of sound levels in environments where levels at several listening positions are of interest. Often in such environments, the installation of measurement microphones for traditional level measurements is highly undesired, and may be avoided completely by employing an embodiments of an estimator of the present invention. The real-time sound level estimator may preferably be configured to perform the method of determining in real-time an estimate of a Sound Pressure Level or Sound Exposure described above, and may advantageously be modified with any of the features mentioned above regarding that method.

Further advantageous embodiments are obtained by combining the various aspects and embodiments described above, e.g. by combining various embodiments of calibrating system properties with various embodiments of estimating in real-time an estimate of an acoustic property such as Sound Pressure Level or Sound Exposure, in systems with one or more listening positions, possibly by using multi-channel test signals for calibration.

DRAWINGS

Figure 4:
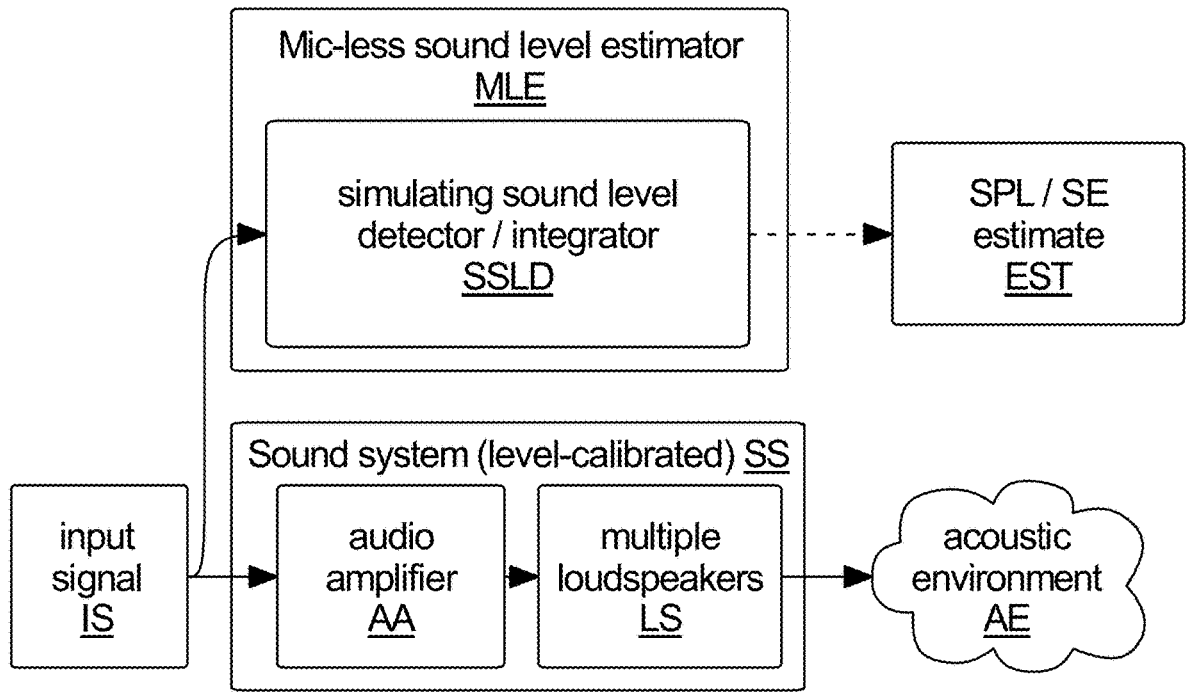
Figure 5:
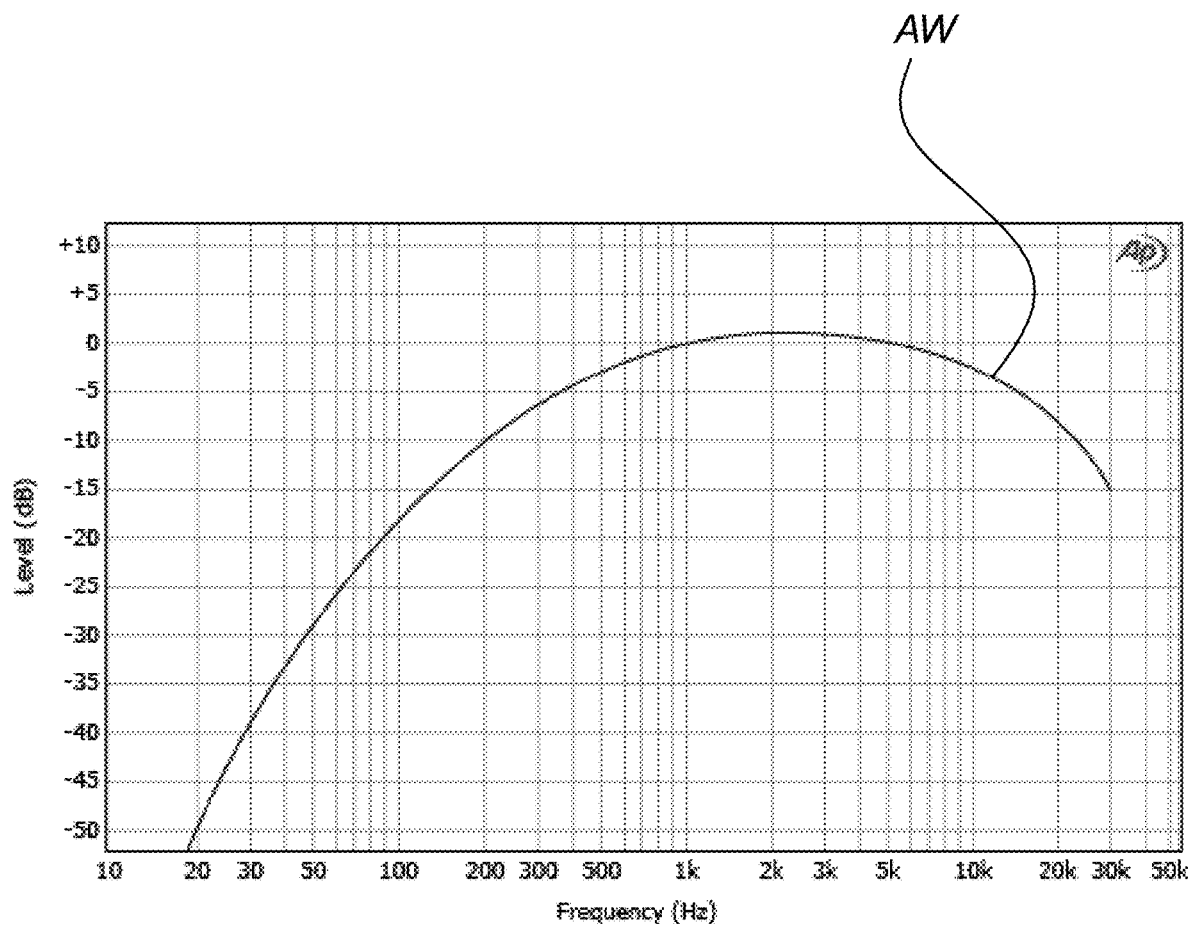
Figure 6:
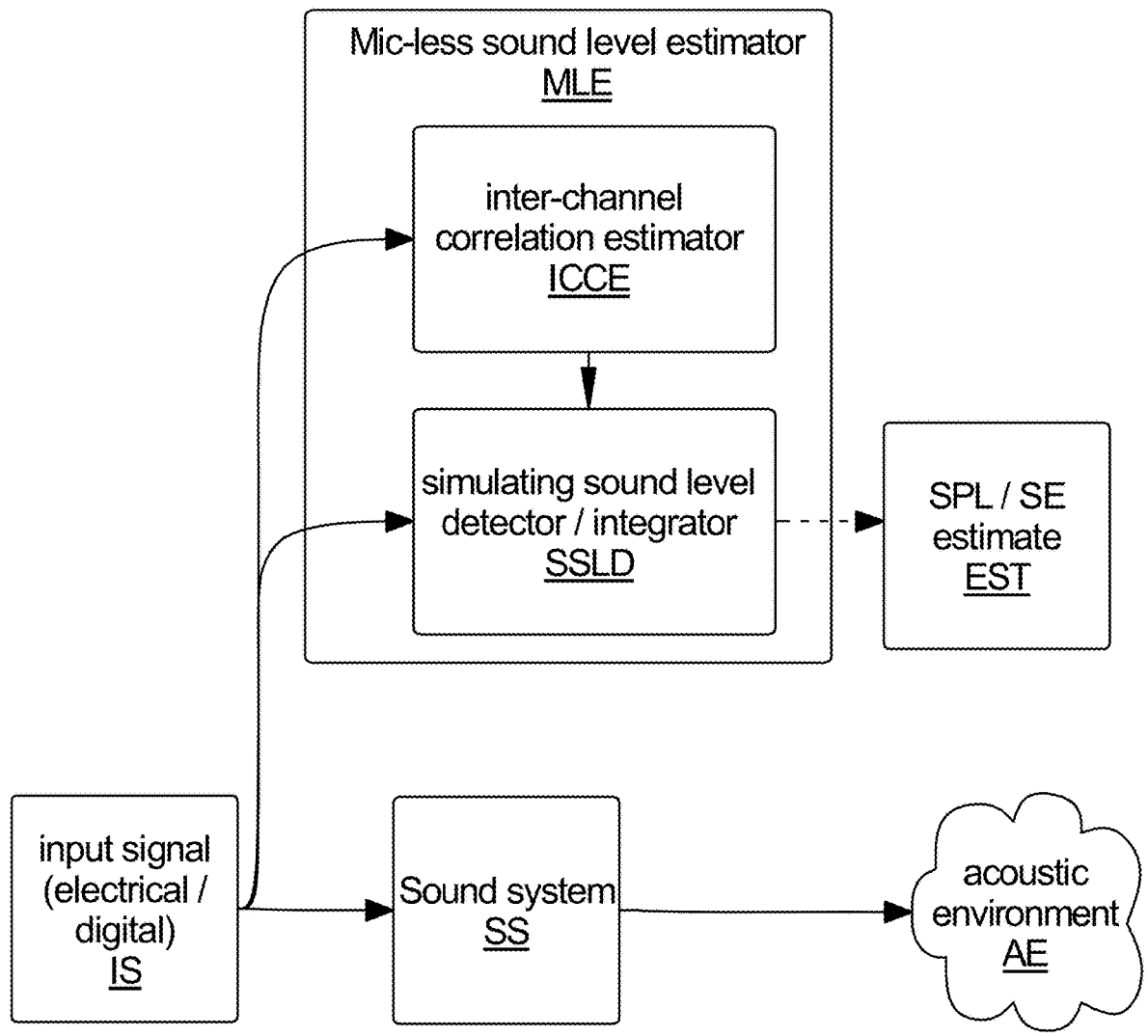
Figure 7:
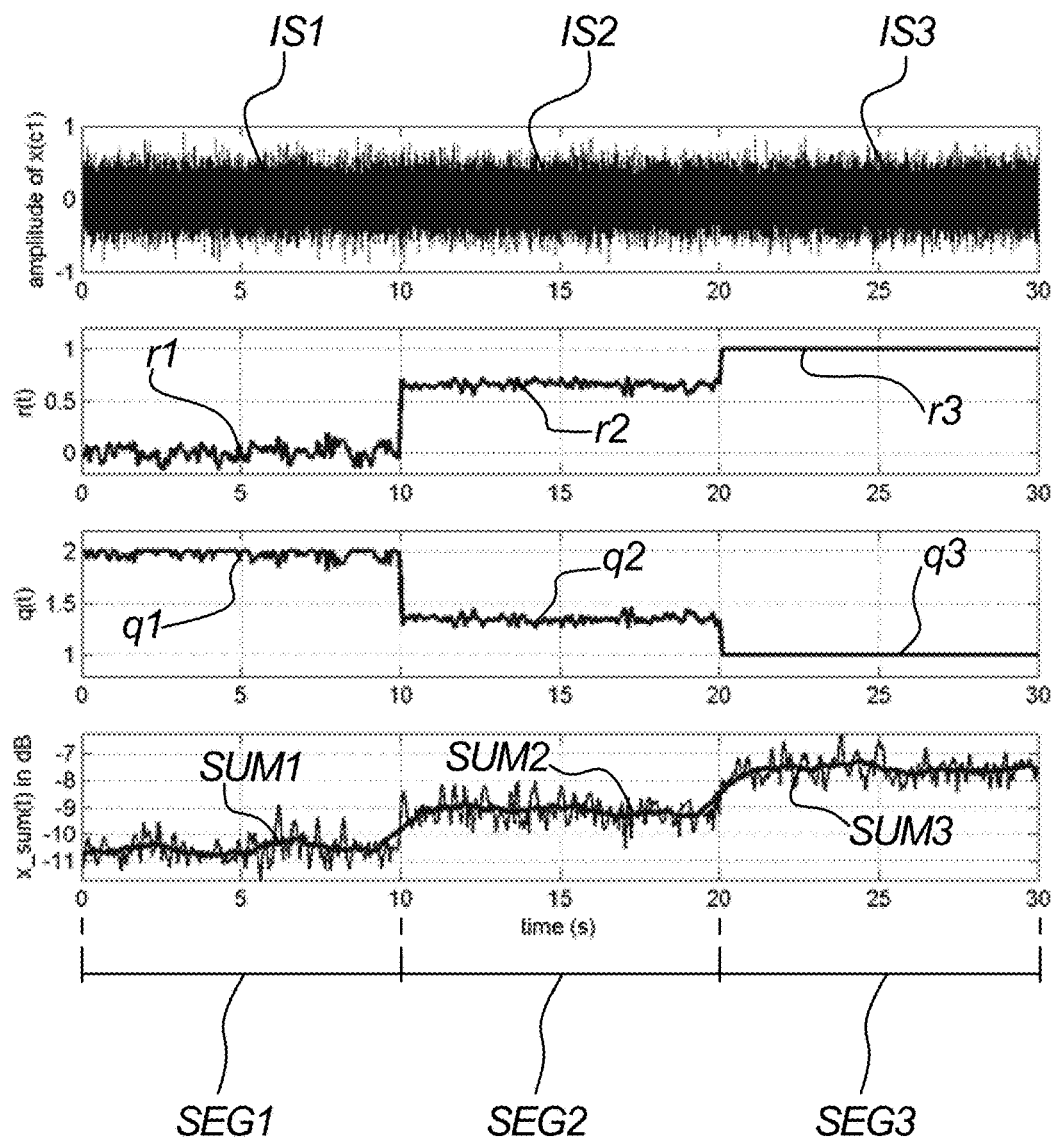
Figure 8:
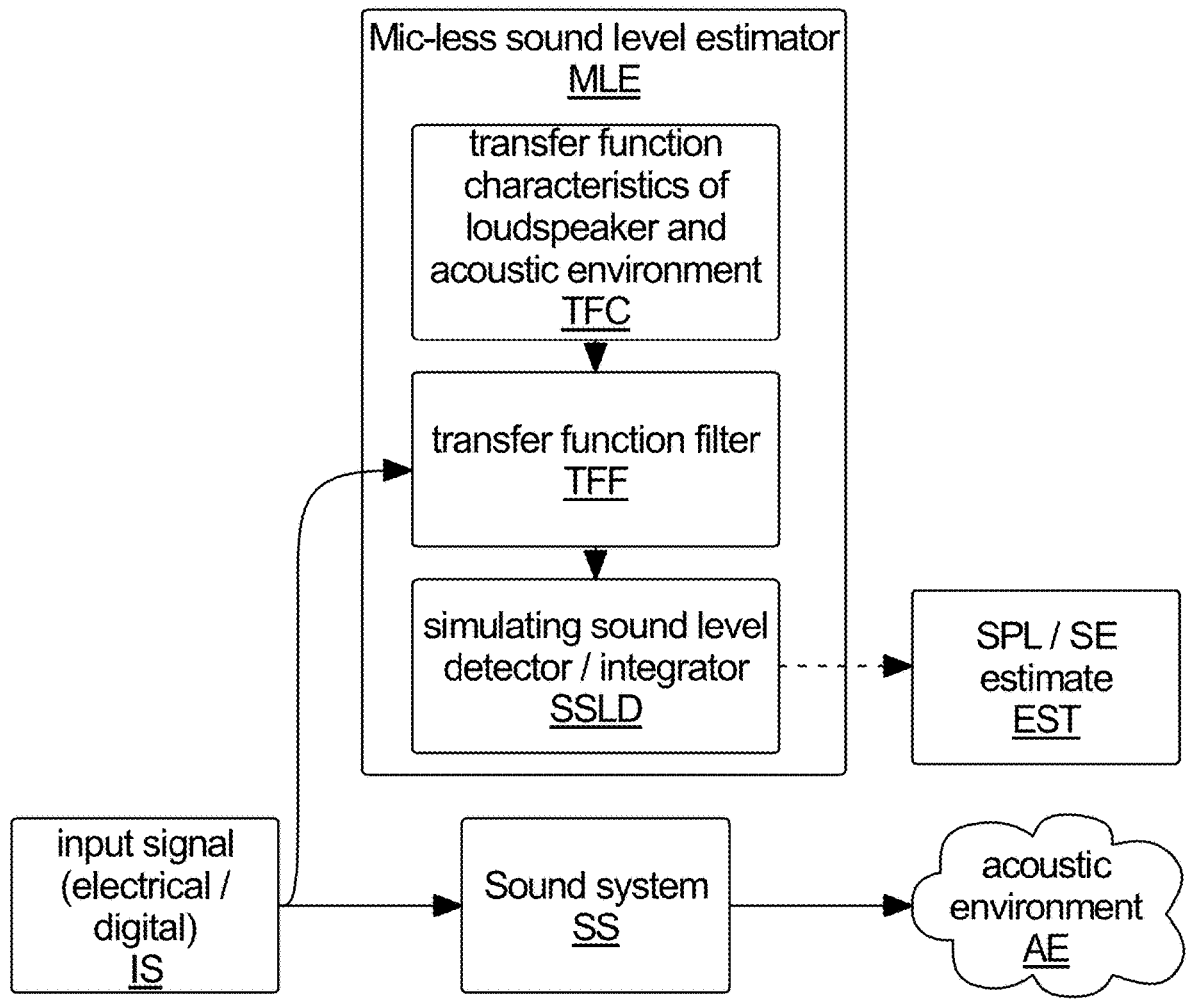
Figure 9:
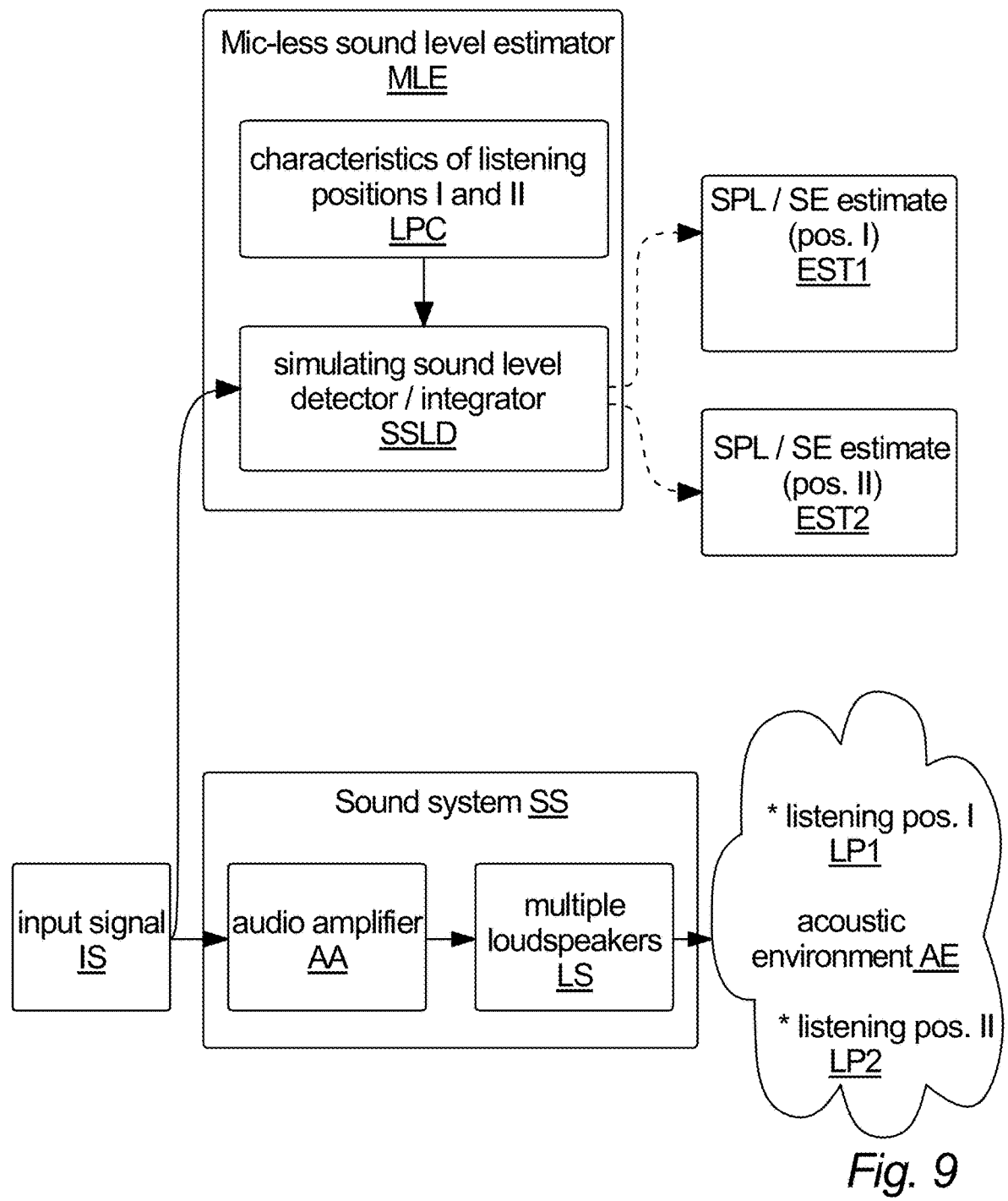
Figure 10:
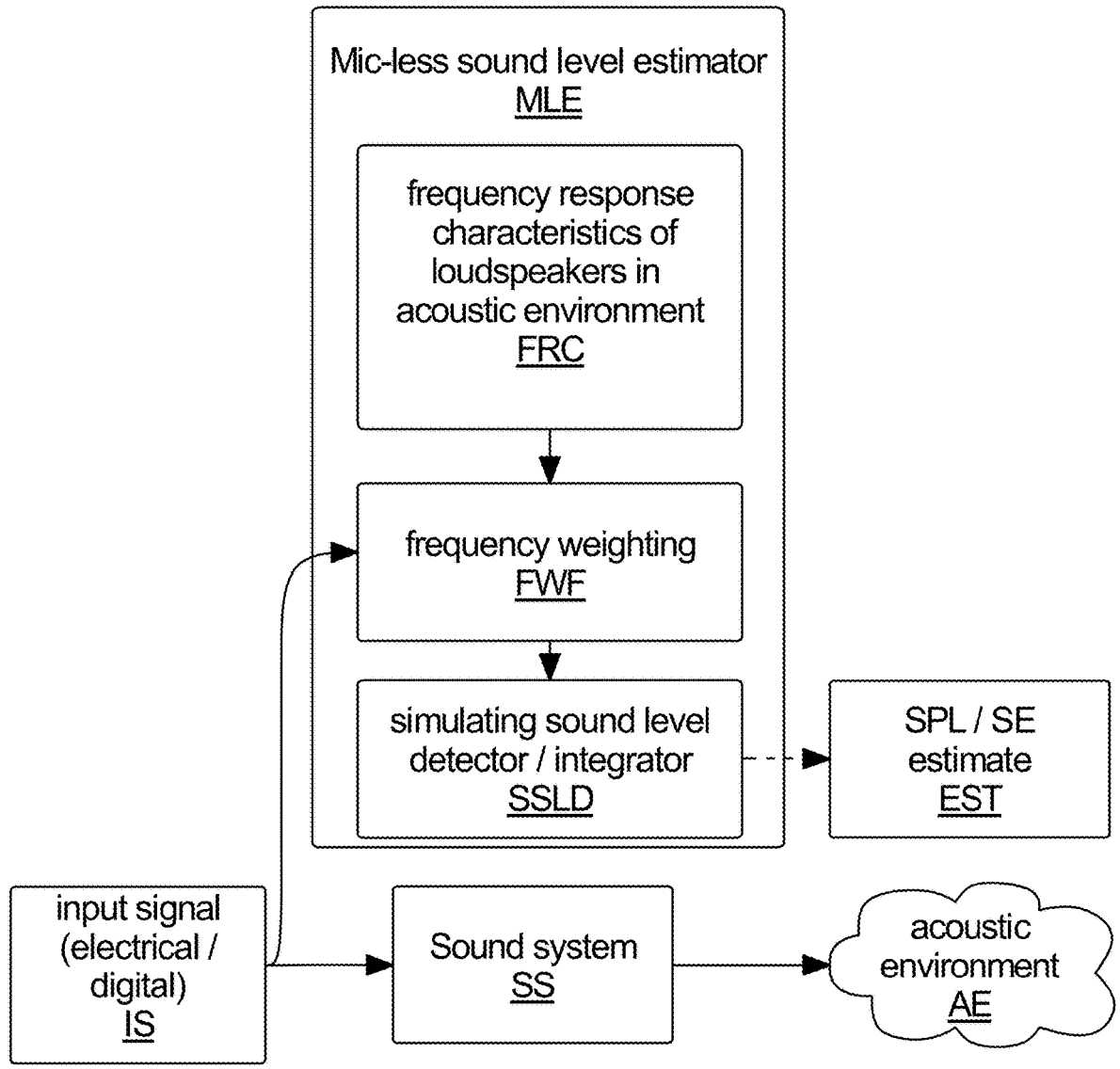
Figure 11:
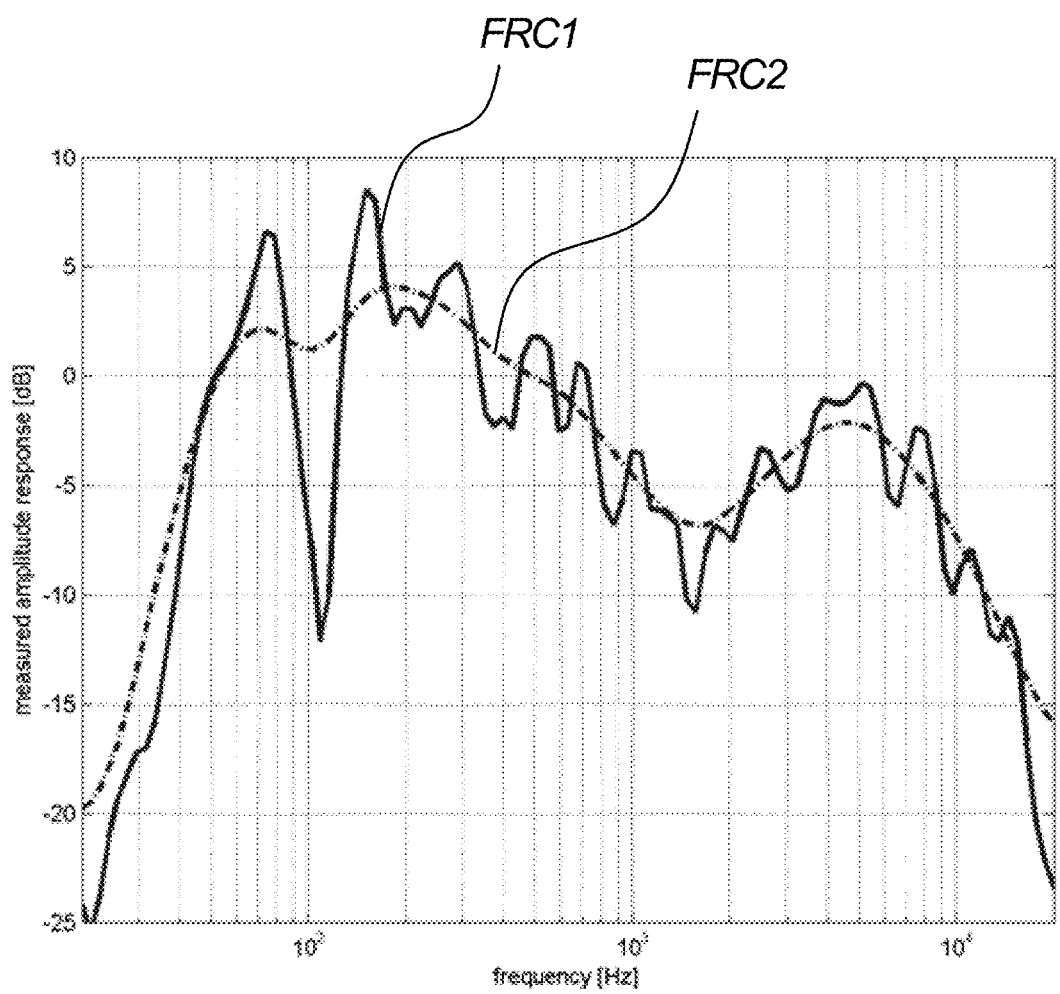
Figure 12:
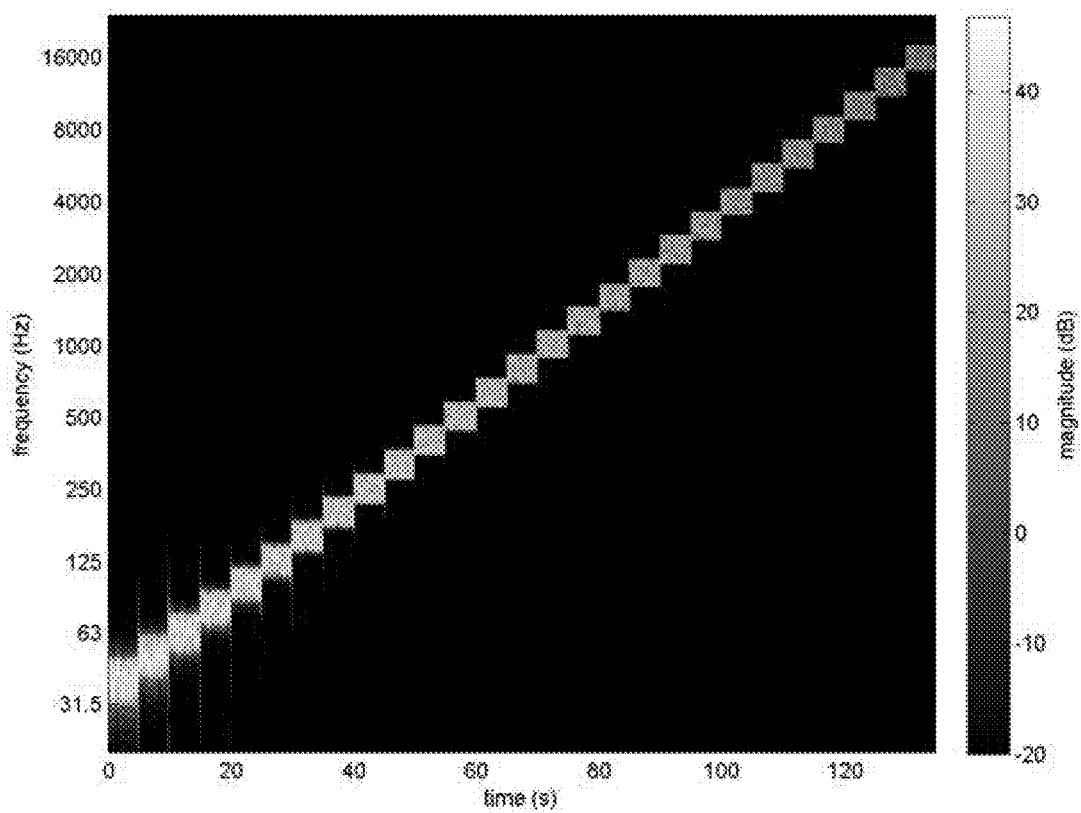
Figure 13:
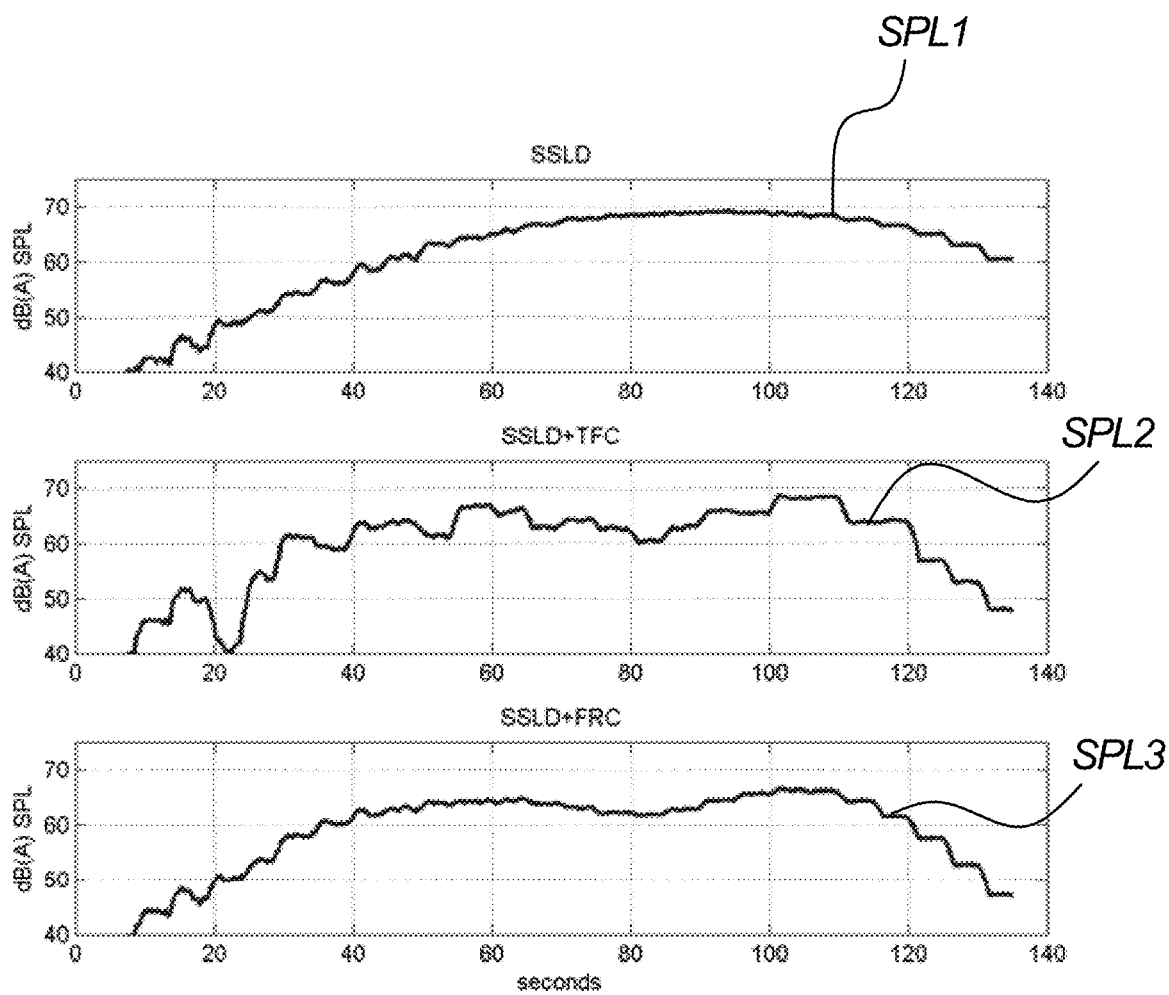
Figure 14:
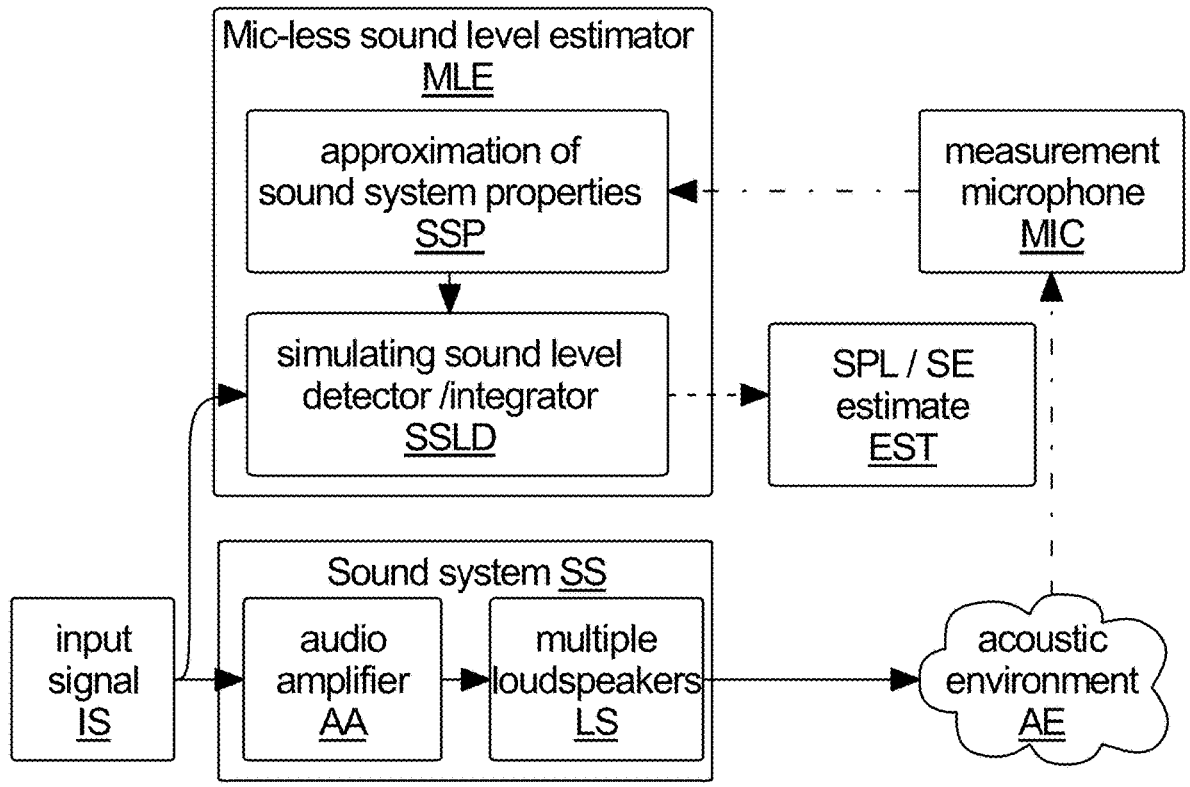
Figure 15:
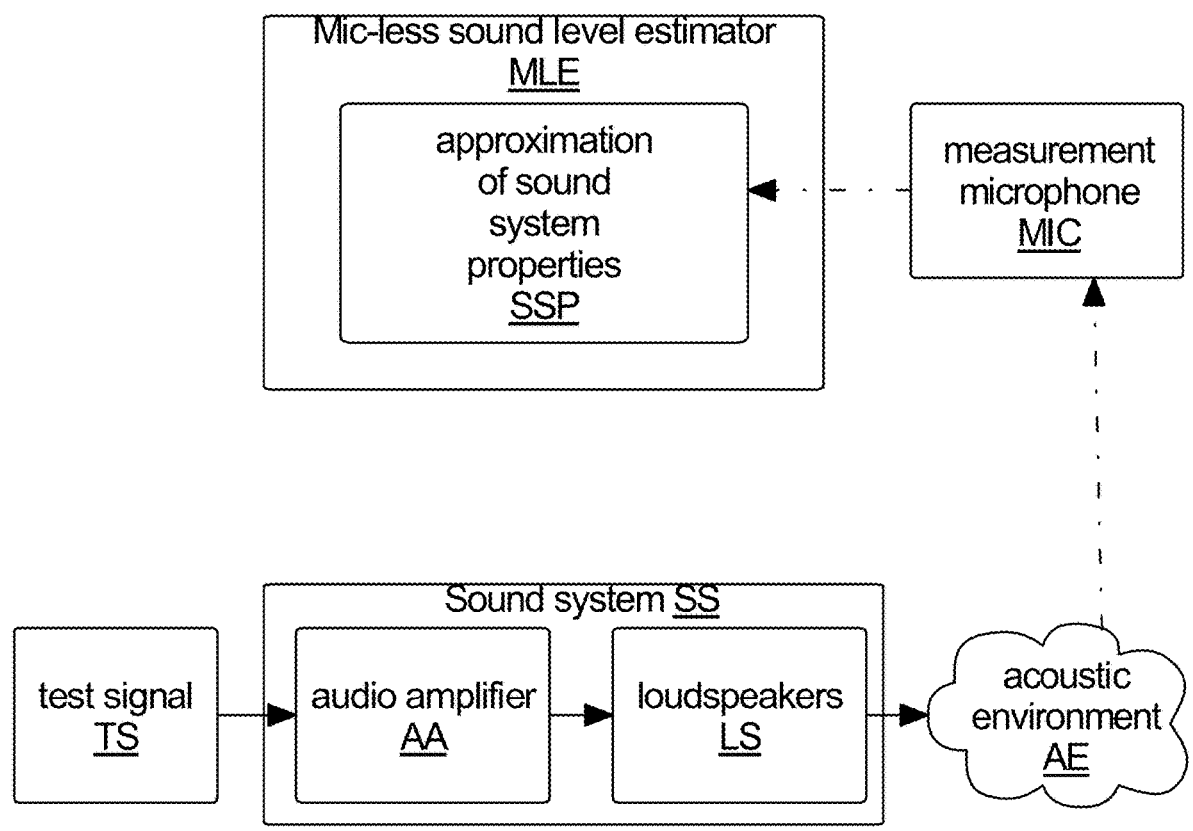
Figure 16:
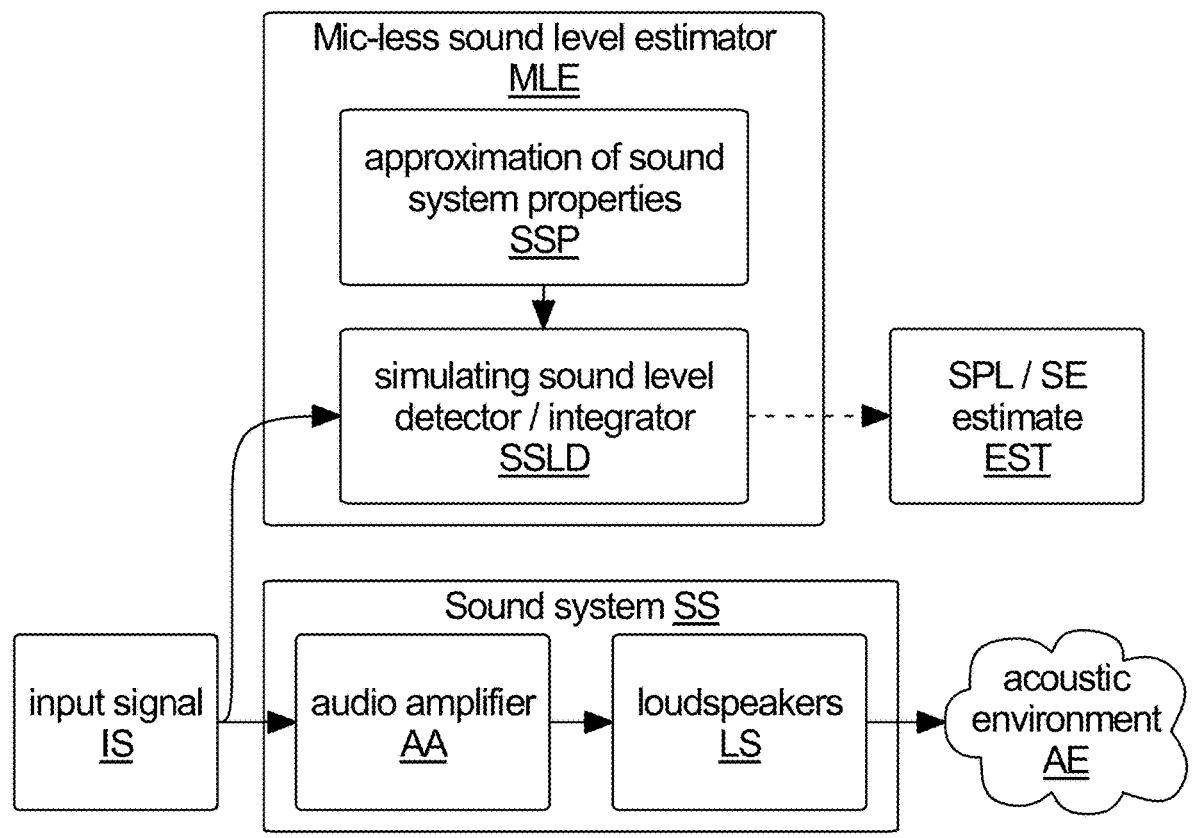
Figure 17:
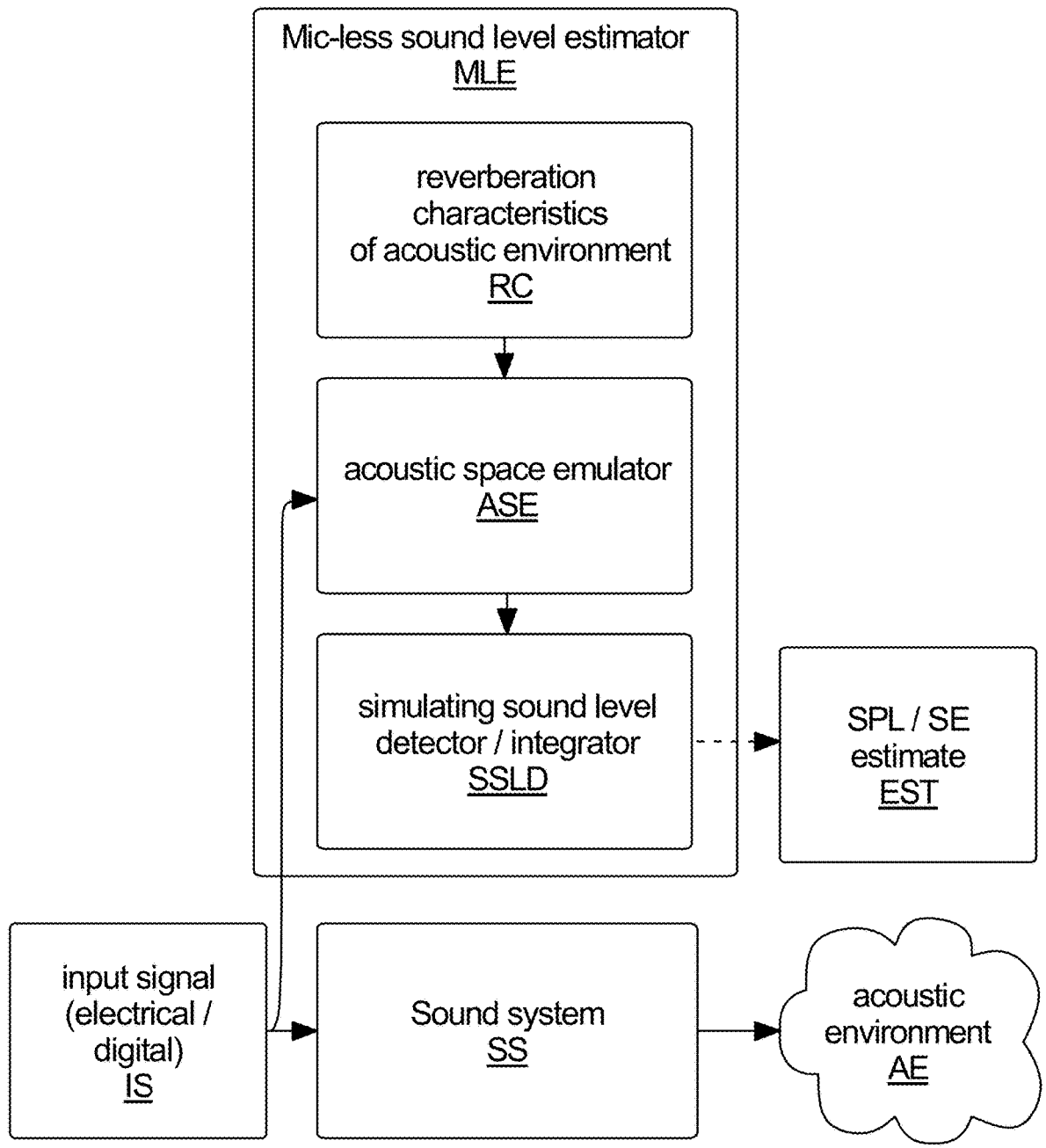
Figure 18:
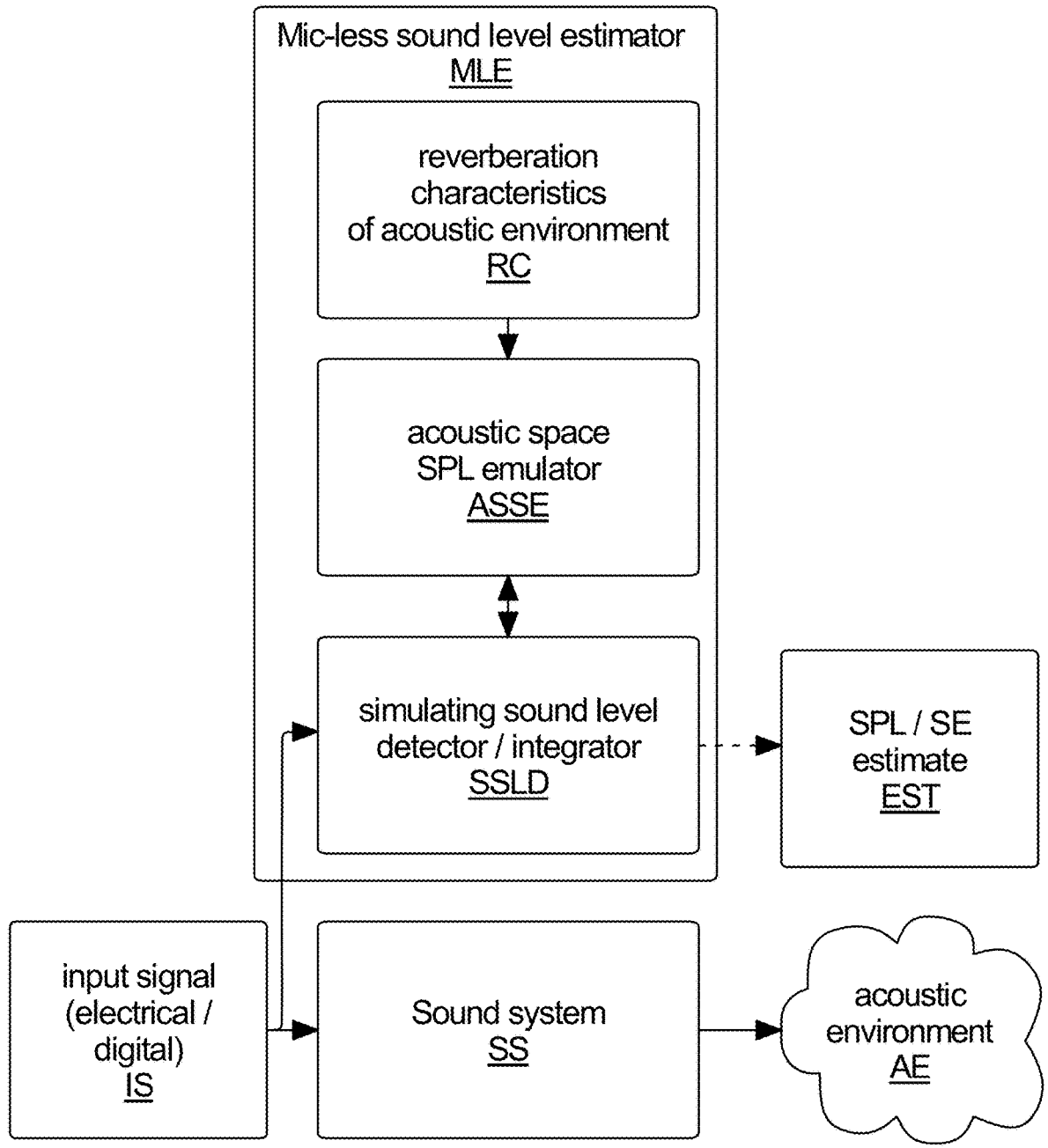

Various embodiments of the invention will in the following be described with reference to the drawings where FIGS. 1-3 illustrate prior art principles for measuring or controlling sound level, FIG. 4 illustrates an embodiment of the invention based on a level-calibrated sound system, FIG. 5 illustrates a frequency response of an A-weighting filter, FIG. 6 illustrates an embodiment of the invention comprising an inter-channel correlation estimator, FIG. 7 shows a plot from an experiment with inter-channel correlation estimation according to an embodiment, FIG. 8 illustrates an embodiment of the invention comprising transfer function characteristics and a transfer filter, FIG. 9 illustrates an embodiment of the invention comprising transfer function characteristics and a transfer filter to produce estimation for several listening positions, FIG. 10 illustrates an embodiment of the invention comprising frequency response characteristics and a frequency weighting, FIG. 11 shows a plot of a frequency response from an experiment, FIG. 12 shows a spectrogram of a test signal used for an experiment, FIG. 13 shows the result of an experiment of estimating an $L_{Aeq,1}$ representation of SPL computed by 3 different embodiments, FIG. 14 illustrates an embodiment of the invention where approximated system properties are based on microphone measurements, FIG. 15 illustrates a first step of an embodiment of a method of the invention for obtaining approximated system properties, FIG. 16 illustrates a second step of an embodiment of a method of the invention for using obtained approximated system properties in estimating SPL and SE, FIG. 17 illustrates an embodiment of the invention employing an acoustic space emulator, and FIG. 18 illustrates an embodiment of the invention employing an acoustic space SPL emulator.

DETAILED DESCRIPTION OF THE EXAMPLE EMBODIMENTS

It is noted that an audio amplifier, as shown e.g. in FIG. 4, FIG. 9 and FIGS. 14-16, though typically part of a sound system and included in preferred embodiments of the invention, may not be implemented in some embodiments of the invention. Hence, an estimate of acoustic properties, preferably a Sound Pressure Level or Sound Exposure, determined by various embodiments of the present invention, may take place before, after, or integrated with the amplification of the input signal, prior to rendering by the loudspeakers.

FIG. 4 is a diagram showing a sound system SS which receives an input signal IS and produces sound in an acoustic environment AE based on the input signal. The sound system comprises an audio amplifier AA and multiple loudspeakers LS. The sound system may optionally comprise further audio processing modules, e.g. decoder, equalizer, compressor, filter, etc. The input signal is a mono-, stereo- or multichannel analog or digital audio signal and the sound system may receive the input signal from an external source or itself integrate with a radio, media player, mixer table, or other audio source establishing the input signal.

The audio amplifier may be any kind of audio amplifier, and the number of channels should preferably correspond to the relevant loudspeaker setup. The multiple loudspeakers are located at different positions relative to the acoustic environment, and may produce audio from different audio channels and/or from common audio channels. For example, the audio amplifier may be a stereo amplifier and the multiple loudspeakers may comprise two speakers receiving different audio channels in a stereo setup or e.g. the audio amplifier is a multi-channel receiver and multiple loudspeakers comprise 6 speakers receiving different audio channels in a surround sound setup, including a subwoofer channel. In another example, the multiple loudspeakers may comprise 25 speakers all rendering the same audio channel, for example for background music in a supermarket. In another example, the multiple loudspeakers may comprise 8 speakers whereof three speakers are positioned along a left side of a room and all receiving a left channel, three speakers likewise positioned along a right side of the room and all receiving a right channel, and the remaining two speakers receiving a subwoofer channel.

Further, a Mic-less sound level estimator MLE is provided, which is arranged, as described in further detail below, to provide, on the basis of the input signal, an estimate EST of the SPL or SE produced in at least one position in the acoustic environment. In the present embodiment, the Mic-less sound level estimator consists of a Simulating sound level detector and integrator SSLD.

In the embodiment of FIG. 4 the sound system SS is level-calibrated with its loudspeakers LS in the acoustic environment AE, such that the relation between levels of the input signal IS and the resulting Sound-Pressure Levels in the acoustic environment AE is known. The level calibration may for example be achieved by measuring the sound pressure level produced by a calibration signal consisting of pink noise at an RMS-level of −20 dBFS, for example in a sound system with the input signal IS being a digital stereo signal (i.e. 2 channels). For simplicity of this description, frequency-weighting in the level-calibration is ignored, without limiting the scope of the present invention. This calibration signal, played through either the left or the right input signal channel, through a stereo sound system, will then produce, for example, 80 dB SPL in the acoustic environment AE. This is what the level-calibration asserts, for at least one listening-position in the acoustic environment AE. In practice, there may be many different methods and official recommendations for achieving the level-calibration, as known by the person skilled in the art.

Given the level-calibration, the Simulating sound level detector and integrator SSLD can calculate estimates EST such as Sound Pressure Level estimates SPL-EST and Sound Exposure estimates SE-EST, in real-time and on the basis of the input signal, as follows, with the procedure applying equally to other calibration-signals, and -levels:

Procedure to Compute an SPL-EST of the "$L_{Aeq,15}$" Measure, Formally Known as the "Equivalent-Continuous A-Weighted Sound Level, 15 Minute Time Period":

This description and the following is based on discrete-time processing, as would be employed in digital implementation of the embodiments. In this case, the input signal IS would be in a digital format, or it would be converted to digital by an A/D converter. The processing steps could be implemented on a DSP or a CPU with support from relevant kinds of memory. The resulting SPL-EST or SE-EST could for example be stored in memory, logged for future reference, transmitted over a network, and/or shown on a display.

Step 1. A-Weighting

Each individual channel of the input signal IS is filtered with an A-weighting filter. The filter is designed to match the requirements for the "A" frequency weighting, as defined in International standard IEC 61672 and ANSI S 1.4. A frequency response AW of an A-weighting filter is illustrated in FIG. 5.

The operation is shown in Eq. 1 as a convolution, with $A(i)$ being the i'th coefficient of a direct form FIR-filter implementing the A-weighting, with $A_n$ being the filter order. The $x(c,t)$ refers to channel c of the input signal IS at time t. In an advantageous embodiment, an IIR filter could be used to implement the A-weighting filter, as a computational optimization. Here and in the rest of the description, a separate channel typically also means a separate loudspeaker from the multiple loudspeakers. In other words, the number of audio channels and the number of loudspeakers are preferably equal.

$$x_A(c, t) = \sum_{i=1}^{A_n} x(c, t - i) \cdot A(i) \quad \text{(Eq. 1)}$$

Step 2. RMS-Integration

Defining T as the number of samples in the input signal IS corresponding to the time period of the $L_{eq}$-measure in question, a sampling rate of 48.0 kHz, results in T=15 min=43.2 MS (mega-samples, i.e. million samples). Integration of the values of each channel may be performed according to the formula Eq. 2 below. In an advantageous embodiment, the sum in Eq. 2 is split into several buffered sub-sums over smaller periods, corresponding to the necessary time-resolution of the estimate, as a computational optimization.

$$x_{RMS}(c, t) = \sqrt{\frac{1}{T}\sum_{i=1}^{T} x_A(c, t-i)^2} \quad \text{(Eq. 2)}$$

Step 3. Channel-Summation

As the channels are mixed in the acoustic environment, their individual values have to be combined, which may preferably be performed according to Eq. 3. Here $C_n$ is the number of channels of input signal IS (e.g. $C_n=2$, for stereo). Essentially, $X_{SUM}$ is the total, averaged energy of the frequency-weighted input signal, over the most recent time-period of the given duration.

$$x_{SUM}(t) = \sqrt{\sum_{c=1}^{C_n} x_{RMS}(c, t)^2} \quad \text{(Eq. 3)}$$

Step 4. Simulated Sound Pressure

To establish a simulated, averaged sound pressure in the acoustic environment in units of Pascal (Pa), the calculated averaged signal energy from Eq. 3 is combined with the result of the level calibration described above, by Eq. 4. $L_{ref}$ corresponds to the level of the calibration signal, for example −20 dBFS as in the above example, and $L_{cal}$ corresponds to the Sound Pressure Level produced by the sound system SS in response to the calibration signal, for example 80 dB SPL as was measured in the above example. In Eq. 4 is also applied that a sound pressure of 1 Pa corresponds to 94.0 dB SPL.

$$p_{SUM}(t) = \sqrt{x_{SUM}(t)^2 \cdot 10^{(-L_{ref}+(L_{cal}-94))/10}} Pa \quad \text{(eq. 4)}$$

Step 5. $L_{eq}$-Calculation

An estimated, equivalent-continuous sound level (SPL_EST) can be computed by Eq. 5 based on the above results. In Eq. 5 the standard reference sound pressure, $p_0=20$ μPa, is used.

$$L_{Aeq,15}(t) = 10 \cdot \log_{10}\left(\frac{p_{SUM}^2(t)}{p_0^2}\right) dB \quad \text{(Eq. 5)}$$

Procedure to Compute an SE-EST of the "$L_{EX,8h}$", Formally Known as the "Noise Exposure Level Normalized to a Nominal 8 h Working Day":

Eq. 2 is replaced with Eq. 6, calculating an integration instead of an average. In practice, this integrator may be reset (i.e. t:=0), for example, at the beginning of each working day.

$$x_{INT}(c, t) = \sqrt{\sum_{i=1}^{t} x_A(c, t-i)^2} \qquad \text{(Eq. 6)}$$

Eq. 3-4 are employed unchanged, i.e. employing $x_{INT}$ instead of $x_{RMS}$, leading to the final calculation of $L_{EX,8h}$. Here $T_n$=8 hours, as the standard working day duration, based on which the sound exposure is normalized. Other measures of sound exposure (noise exposure), such as E, SEL, $L_{avg}$, and Dose %, can be calculated analogously.

$$L_{ex,8h}(t) = 10 \cdot \log_{10}\left(\frac{p_{SUM}^2(t)}{p_0^2}\right) + 10 \cdot \log_{10}\left(\frac{T}{T_n}\right) \text{ dB} \qquad \text{(Eq. 7)}$$

Procedure to Compute an SPL-EST of the "$L_{Cpeak}$" Measure, Formally Known as the "Peak Sound Pressure Level, C-weighted":

Some regulations require the absolute peak SPL to be measured—in addition to an $L_{eq}$—to protect against hearing damages caused by sudden large pressure peaks and high-level transient noises.

Step 1. C-Weighting

The C-weighting is commonly employed in connection with peak SPL measurement. It has a different frequency response than the A-weighting, but may be implemented similarly to Eq. 1. The x(c,t) refers to channel c of the input signal IS at time t.

$$x_C(c, t) = \sum_{i=1}^{C_n} x(c, t-i) \cdot C(i) \qquad \text{(Eq. 8)}$$

Step 2. Peak Level Detector.

The absolute peak sound level is estimated, in the input signal-domain.

$$x_{PK}(c, t) = \max_{1 \leq i \leq T} |x_C(c, t-i)| \qquad \text{(Eq. 9)}$$

Step 3. Channel-Summation

The peak level is estimated across channels of the input signal IS.

$$x_{SUM}(t) = \max_{1 \leq c \leq C_n} x_{PK}(c, t) \qquad \text{(Eq. 10)}$$

Step 4. Simulated Sound Pressure

Analogous to Eq. 4.

$$p_{SUM}(t) = \sqrt{x_{SUM}(t)^2 \cdot 10^{(-L_{ref}+(L_{cal}-94))/10}} Pa \qquad \text{(Eq. 11)}$$

Step 5. $L_{peak}$ Calculation

The estimated, peak sound level can now be computed. Equivalently, the parameter $p_{peak}$ would be $L_{peak}$ in units of Pascal.

$$L_{C,peak}(t) = 10 \cdot \log_{10}\left(\frac{p_{SUM}^2(t)}{p_0^2}\right) \text{dB} \qquad \text{(Eq. 12)}$$

Inter-Channel Correlation

The accuracy of the channel-sum estimate, calculated in Eq. 3, may be improved by taking into account an inter-channel correlation.

FIG. 6 shows a diagram of an embodiment with an input signal IS feeding a sound system SS consisting of an amplifier connected to multiple loudspeakers which produce sound in an acoustic environment AE; the sound system SS has been level-calibrated in the acoustic environment AE. Also fed by the input signal is a Mic-less sound level estimator MLE, consisting of a Simulating sound level detector SSLD, capable of producing estimates of SPL and/or Sound Exposure SPL EST. The embodiment of FIG. 6 resembles that of FIG. 4 with the addition that the Mic-less sound level estimator MLE in the present embodiment further comprises an Inter-channel correlation estimator ICCE, which also receives the input signal IS.

Thereby this embodiment is enabled to take into consideration that two or more audio channels may be correlated, and thereby cause a real sound pressure which is higher than the estimated SPL. The error of an estimation not taking inter-channel correlation into account may be as high as 3 dB for 2 channels, and even higher for more correlated channels, for example 7 dB for 5 channels. Hence, it is preferred to provide embodiments of the invention with inter-channel correlation estimation. The inter-channel correlation estimator is preferably implemented in the same DSP or CPU implementing the Simulating sound level detector and integrator SSLD, and also receives the input signal IS.

Procedure to Compute an SPL_EST Employing the Inter-Channel Correlation Estimator ICCE:

One embodiment of Mic-less sound level estimator implementing inter-channel correlation estimation is described here. The example assumes a stereo input signal, e.g. one pair of channels $c_1$ and $c_2$, and a selected time frame for the correlation calculation of $T_{short}$=50 ms (in samples), for example. $T_{short}$ may preferably be selected so that it roughly corresponds to the period of the lowest significant frequency produced by the sound system SS.

The inter-channel correlation, at time t, for channel-pair $c_1$ and $c_2$, is denoted $r(t,c_1,c_2)$, and is estimated by the inter-channel correlation estimator ICCE. Eq. 13 calculates the sample correlation coefficient for the two discrete-time signals $x(c_1,t)$ and $x(c_2,t)$, as a function of time. In Eq. 13, the time indices on $x(c,t)$ and on the $\Sigma$'s have been omitted, for clarity; these terms always relate to the range of most recent $T_{short}$ samples, for both channels.

$$r(t, c_1, c_2) = \frac{T_{short}\sum x(c_1)x(c_2) - \sum x(c_1) \sum x(c_2)}{\sqrt{T_{short}\sum (x(c_1))^2 - (\sum x(c_1))^2} \sqrt{T_{short}\Sigma(x(c_2))^2 - (\sum x(c_2))^2}} \qquad \text{(Eq. 13)}$$

The sound level detector and integrator SSLD may be the same as described above with reference to FIG. 4, except for the following changes to Eq. 2 and 3, based on the the r( )-function of Eq. 13; thereby this embodiment of the sound level detector and integrator SSLD adapts its estimate to properties in addition to the time-varying level of the input signal channels.

$$x_{RMS}(c,t) = \sqrt{\frac{1}{T}\sum_{i=1}^{T_{short}} x_A(c,t-i)^2} \quad \text{(Eq. 14)}$$

and $$x_{SUM}(t) = \sqrt[q(t,c_1,c_2)]{\sum_{i=1}^{T/T_{short}} x_{RMS}(c_1,t)^{q(t,c_1,c_2)} + x_{RMS}(c_2,t)^{q(t,c_1,c_2)}} \quad \text{(Eq. 15)}$$

where q is in the interval [1,2], and may be defined as:

$$q(t,c1,c2)=2-\max(0,r(t,c1,c2)) \quad \text{(Eq. 16)}$$

The max( )-operator returns the maximum value of 0 and the r( )-function, as the effect of destructive interference of channels may not be desirable to include due to its dependency on frequency and specific position in the acoustic environment AE. Other embodiments may consider destructive interference to some degree.

Other q( )-functions may be implemented in various embodiments with various effects and advantages, some of which are applied below, and may be applied in this embodiment instead of Eq. 16, mutatis mutandis.

FIG. 7 shows a plot of an example of the consequences of inter-channel correlation of a 2-channel input signal IS consisting of 3 sound segments, 10 s each.

The first segment SEG1 from 0 to 10 seconds contains pink noise IS1, based on noise generated independently for the 2 channels (i.e. inter-channel correlation of 0.0).

The second segment SEG2 from 10 to 20 seconds contains pink noise IS2, based on noise generated specifically to have an inter-channel correlation of 0.66.

The third segment SEG3 from 20 to 30 seconds contains pink noise IS3, same generated signal for the 2 channels (i.e. inter-channel correlation of 1.0).

Note that the 3 segments in the experiment have identical levels and frequency spectrums, both within and across the individual channels; that is, the interchannel-correlation is the only difference. The plot shows the actual waveform, the corresponding values r1, r2, r3, q1, q2, q3, of the r( ) and q( ) functions as calculated from Eq. 13 and 16, and the resulting $x_{SUM}$( ) SUM1, SUM2, SUM3, of Eq. 15 over time.

From the experiment first segment SEG1 it can be seen, that an embodiment failing to take the inter-channel correlation into account, would normally produce an $x_{SUM}$SUM1 around −11 dB (in the example), i.e. corresponding to a correlation R1=r(t)=0. On the other hand, for the segment SEG3 from 20 to 30 seconds with complete correlation, i.e. R3=r(t)=1, the resulting $x_{SUM}$ is around −8 dB. Hence, an error of up to 3 dB (in the experiment) would be made by not considering inter-channel correlation in the SPL estimation.

Another example of an embodiment of a sound system has 4 channels, where the 4-channel input signal IS of the example is known to comprise inter-channel correlation within two channel-pairs, but not between the other channels; that is $c_1$ and $c_2$ may be correlated, and $c_3$ and $c_4$ may be correlated. In this case, Eq. 15 is applied three times, with three different q( ) functions:

$$q(t,c1,c2)=2-\max(0,r(t,c1,c2)) \quad \text{(Eq. 17)}$$

$$q(t,c3,c4)=2-\max(0,r(t,c3,c4)) \quad \text{(Eq. 18)}$$

and $$q(t,c12,c34)=2 \quad \text{(Eq. 19)}$$

where Eq. 17 and 18 correspond to Eq. 16 and relates to two channels, each, and Eq. 19 is for summing the two channel-pairs together to total, under the assumption that the pairs are not correlated. Eq. 19 may be adjusted to include a similar r ( )-function if correlation between the pairs could also be expected. In an embodiment, the q( )-functions may be dynamically implemented so that they may relate to the channels pairs showing the highest correlation at a specific point in time, thereby for example calculating correlation for all channel pairs, but only applying Eq. 15 for the channels pairs showing a correlation above a predetermined threshold, e.g. 0.5, and summing the remaining channels according to Eq. 3. In another embodiment, particularly relevant for sound system SS with a high number of channels, e.g. 22 channels, it may be advantageous to perform down-mixes of a number of adjacent channels, e.g. each 3 channels, and then calculate correlation between pairs of downmixes.

In another embodiment with a larger number of channels, e.g. PA systems, loudspeaker installations in a building, etc. it may be advantageous to calculate the level of one or more sub-mixes, that is, first summing the signals in certain subsets of the input signal IS channels. These channel subsets may be selected such that the contributions from adjacent loudspeakers are summed, and in the subsequent computations considered as one signal.

Furthermore, the level of such a sub-mix and the channel-summed individual levels (e.g. Eq. 3) may be employed as a high and low bound of the estimate, respectively. Hence, the estimated channel-summed level may continually be chosen somewhere in between these bounds; this choice could be refined further by incorporating the diffuseness of the room and/or the proximity of the loudspeaker involved. This method may lead to a more accurate estimate of SPL and/or SE, e.g. for a larger number of loudspeakers or as a supplement to the inter-channel correlation estimator ICCE method.

In an advanced embodiment, the SPL_EST and SE_EST estimates may be improved further by taking into account that the significance of inter-channel correlation in real world setups depends on the diffuseness of the acoustic environment AE. In an embodiment the diffuseness is pre-determined, e.g. by assumption by a user or from room specifications, and input as a number, D, which denotes the diffuseness as a continuous parameter in the interval [0,1], where, 0=very "damped" acoustic environment AE (e.g. an anechoic chamber), aka. "free field", and 1=very reverberant, aka. "diffuse field". The q( )-function of Eq. 16 is substituted with Eq. 20 to take into account diffuseness in the handling of inter-channel correlation:

$$q(t,c1,c2)=\max(2,2-\max(0,r(t,c1,c2))+D) \quad \text{(Eq. 20)}$$

In alternative embodiments the q( )-function may be implemented differently, e.g. by scaling instead of limiting in Eq. 20 to stay below a value of 2, by designing r( ) and D to be multiplicative instead of additive, etc.

An advanced embodiment, estimating the $L_{Cpeak}$, may also benefit from a pre-determined diffuseness D of the acoustic environment AE. In this case, Eq. 9 and Eq. 10 may be replaced with Eq. 21 to 23:

$$q = D+1 \quad \text{(Eq. 21)}$$

where the instantaneous peak sound level, in the input signal domain, is estimated as:

$$x_{SUM}(t) = \sqrt[q]{\sum_{c=1}^{C_n} |x(c,t)|^q} \quad \text{(Eq. 22)}$$

and the the peak level, over time, would then be:

$$x_{PK}(t) = \max_{1 \le i \le T} x_{SUM}(t-i) \quad \text{(Eq. 23)}$$

As seen, the q( )-function handling the combining of contributions from different channels, may in some embodiments be independent of a channel correlation function r( ). In Eq. 21, a higher diffuseness, i.e. with D closer to 1.0, implies that the combined effect of individual channels on the total peak sound level is smaller, due to the (diffuse) reflections being relatively strong compared to the direct sound.

Transfer Function Characteristics

FIG. 8 shows a diagram of an embodiment with an input signal IS feeding a sound system SS consisting of an amplifier connected to multiple loudspeakers which produce sound in an acoustic environment AE; the Sound System has been level-calibrated in the acoustic environment. Also fed by the input signal is a Mic-less sound level estimator MLE, consisting of a Simulating sound level detector SSLD, capable of producing estimates EST of SPL and/or Sound Exposure SPL_EST. The embodiment of FIG. 8 resembles that of FIG. 4 with the addition that the Mic-less sound level estimator MLE in the present embodiment further comprises Transfer function characteristics TFC of loudspeakers in the acoustic environment AE and a transfer function filter TFF for applying the transfer function characteristics TFC to the input signal IS in connection with the estimation of SPL or SE.

Thereby this embodiment is enabled to take into consideration the influence on the sound produced by the multiple loudspeakers, the room and furniture or other environment properties, preferably in consideration of a specific listening position. The transfer function characteristics may represent frequency response, phase response, gain, reflections, reverberation, etc. The estimated SPL for that specific setup and listening position may thereby be more accurate. The transfer function filter is preferably implemented in the same DSP or CPU implementing the simulating sound level detector and integrator SSLD, and also receives the input signal IS. The transfer function characteristics TFC may preferably be stored in memory included in or connected to the DSP or CPU.

The transfer function characteristics TFC may be obtained by performing an impulse response measurement of the sound system SS in the acoustic environment AE, per channel, per listening position. Several ways of measuring such an impulse response are known in the art, e.g. by using pure tone frequency-sweeps (also known as chirps), typically in combination with a Fourier analysis with appropriate windowing and averaging properties. Equivalent to the impulse response would be the actual transfer function, which is the quotient of the cross power spectral density and the power spectral density between a test signal input as input signal IS and the corresponding acoustically measured signal. The transfer function characteristics TFC may be measured for example when the sound system SS is installed, or in connection with maintenance or re-calibration, or prior to a certain event or performance. In an embodiment, a test signal as described below with reference to FIG. 15 is used to determine the transfer function characteristics TFC.

For each listening-position, each channel of the input signal may be processed by a filter implementing the transfer function for the corresponding loudspeaker (i.e. convolution). An improved estimate of SPL or Sound Exposure could be determined, by performing this processing, preferably as a first step, in determining said estimate. Advantageous of this embodiment is that it essentially considers the combined effects of the frequency response, the effect of inter-channel correlation including potentially both constructive and destructive interference, and the reverberation.

Procedure to Compute an SPL_EST Employing the Transfer Function Characteristics TFC for a Single Listening Position:

One embodiment of Mic-less sound level estimator MLE implementing transfer function characteristics TFC and corresponding filtering is described here, where x(c,t) refers to channel c of the input signal IS at time t. Further details of the variables and parameters may be found in the description of the embodiment of FIG. 4 above, mutatis mutandis.

Step 1: Transfer Function Filter

Let TF(c,i) denote the i'th coefficient of the transfer function for channel c from, and including, the loudspeaker to a specific listening position, realized as a FIR filter (direct form). Apply the FIR filter implementing the transfer function, per channel, to the input signal IS.

$$x_{TF}(c,t) = \sum_{i=1}^{TF_n} x(c, t-i) \cdot TF(c,i) \quad \text{(Eq. 24)}$$

As the transfer function may represent an impulse response of the acoustic environment AE, lasting several seconds to represent reverberation, etc., the order of the FIR filter, implementing the transfer function, may be 100,000 or more. In an advanced embodiment, the transfer function filter is implemented as FFT-based fast convolution, to reduce the computational complexity.

Step 2: Channel-Summation

The channels of the input signal IS are mixed. Note that this "sample-level" type of channel summation is appropriate in preferred embodiments where the TF(c) represents time- and frequency-domain characteristics for each channel; as opposed to other embodiments without the transfer function, where an energy summation of the channels would be preferable.

$$x_{MIX}(t) = \sum_{c=1}^{C_n} x_{TF}(c, t) \quad \text{(Eq. 25)}$$

Step 3. A-Weighting

The A-weighting is the same for all channels, and thus the A-weighting filter may advantageously be applied after the channel-summation. Further details regarding A-weighting is given above with reference to FIG. 5.

$$x_A(t) = \sum_{i=1}^{A_n} x_{MIX}(t-i) \cdot A(i) \qquad \text{(Eq. 26)}$$

Step 4. RMS-Integration.

To make the filtered, mixed and A-weighted, but still sample-by-sample represented input signal more steady for the estimation, it is RMS-integrated, for example according to Eq. 27. This step could be replaced with an averaging, an integration, or a peak-detection, depending on the kind of SPL_EST or SE_EST in question.

$$x_{RMS}(t) = \sqrt{\frac{1}{T}\sum_{i=1}^{T} x_A(t-i)^2} \qquad \text{(Eq. 27)}$$

Step 5. Simulated Sound Pressure

A simulated, averaged sound pressure in the acoustic environment in units of Pascal (Pa) is established by combining the obtained $x_{RMS}(t)$ with the level calibration of the system, as described above:

$$p_{SUM}(t) = \sqrt{x_{RMS}(t)^2 \cdot 10^{(-L_{ref} + (L_{cal} - 94))/10}} Pa \qquad \text{(Eq. 28)}$$

Step 6. $L_{eq}$-Calculation

Finally, an estimated, equivalent-continuous sound level (SPL_EST) can be computed by Eq. 5 above according to the corresponding description thereof, using $p_{SUM}(t)$ obtained by Eq. 28.

If alternatively or additionally, an sound exposure SE-EST of the "$L_{EX,8h}$" is desired, it may be calculated by substituting Eq. 27 with Eq. 29:

$$x_{RMS}(t) = \sqrt{\sum_{i=1}^{t} x_A(t-i)^2} \qquad \text{(Eq. 29)}$$

and using Eq. 7 for calculating the sound exposure from the $p_{SUM}(t)$ produced by Eq. 28.

Likewise, other estimate types, e.g. the other types mentioned above, may be calculated for a single listening position based on transfer function characteristics and transfer function filter of the embodiment of FIG. 8, from the templates described above, mutatis mutandis.

Multiple Listening Positions

The embodiments described above have produced SPL or SE estimates EST relating to a single listening position. FIG. 9 presents an embodiment that enables the invention to apply to multiple listening-positions, each with an individual SPL or SE estimate EST. This extension may preferably be applied to any of the other embodiments, mutatis mutandis, when it may be relevant to monitor SPL or sound exposure in more positions simultaneously.

FIG. 9 shows a diagram of an embodiment with an input signal IS feeding a sound system SS consisting of an amplifier AA connected to multiple loudspeakers LS which produce sound in an acoustic environment AE. Also fed by the input signal is a Mic-less sound level estimator MLE, comprising of a Simulating sound level detector SSLD, capable of producing estimates EST1, EST2, of SPL and/or Sound Exposure SPL EST for at least two positions, pos. I, LP1, and pos. II, LP2. The Mic-less sound level estimator MLE comprises characteristics LPC of positions I and II, for example transfer function characteristics from each loudspeaker to each listening position. The characteristics may be stored in a memory integrated with or connected to a DSP or CPU or other processing means implementing the sound level detector and integrator SSLD.

Procedure to Compute an SPL_EST Employing the Transfer Function Characteristics TFC and the Multiple Listening-Positions Feature:

Here follows an example embodiment of adjusting one of the above procedures to multiple listening positions according to the above.

Step 1: Transfer Function Filter

In the present embodiment, the characteristics LPC of the listening positions comprises transfer function characteristics TFC for each combination of loudspeaker and listening position. A FIR filter implementing the TF is applied for each listening-position lp, for each channel c, i.e. each loudspeaker. For example, for 3 listening-positions and a sound system SS with 5 channels, a total of 15 transfer functions would need to be determined, and applied as filters. The following steps and equations resemble the above-described corresponding calculations with the addition of a listening position variable, and the above-described details, naming conventions and constraints or presumptions also apply to the below:

$$x_{TF}(lp, c, t) = \sum_{i=1}^{TF_n} x(c, t-i) \cdot TF(lp, c, i) \qquad \text{(Eq. 30)}$$

Step 2: Channel-Summation $$x_{MIX}(lp, t) = \sum_{c=1}^{C_n} x_{TF}(lp, c, t) \qquad \text{(Eq. 31)}$$

Step 3. A-Weighting $$x_A(lp, t) = \sum_{i=1}^{A_n} x_{MIX}(lp, t-i) \cdot A(i) \qquad \text{(Eq. 32)}$$

Step 4. RMS-Integration.

$$x_{RMS}(lp, t) = \sqrt{\frac{1}{T}\sum_{i=1}^{T} x_A(lp, t-i)^2} \qquad \text{(Eq. 33)}$$

In the final steps, for example $L_{Aeq,15}(lp,t)$ or $L_{C,pk}(lp,t)$ or $L_{EX,8h}(lp,t)$ may be calculated, analogously to above descriptions, but with individual estimates for each listening-position lp.

In other embodiments, the estimates EST1, EST2 for the different listening positions may be calculated from details of a level-calibrated system as described with reference to FIG. 4 above, an inter-channel correlation-corrected embodiment as described with reference to FIG. 6 above, or the embodiments described below.

Frequency Response Characteristics

FIG. 10 shows a diagram of an embodiment with an input signal IS feeding a sound system SS consisting of an amplifier connected to multiple loudspeakers which produce sound in an acoustic environment AE. Also fed by the input signal is a Mic-less sound level estimator, MLE comprising a Simulating sound level detector SSLD, capable of producing estimates EST of SPL and/or Sound Exposure, SPL_EST. The embodiment of FIG. 10 resembles that of FIG. 4 with the addition that the Mic-less sound level estimator MLE in the present embodiment further comprises frequency response characteristics FRC of loudspeakers in the acoustic environment AE and a frequency weighting filter FWF for applying the frequency response characteristics to the input signal IS in connection with the estimation of SPL or SE. The frequency weighting filter may alternatively be implemented by means of a filter bank.

Thereby this embodiment is enabled to take into consideration the frequency-specific influence on the sound caused by the multiple loudspeakers, the room and furniture or other environment properties, possibly in further consideration of a specific listening position. The estimated SPL for that specific setup and listening position may thereby be more accurate, compared to the basic sound level detector and integrator SSLD, for sound system SS which have a non-flat frequency response of the loudspeaker channels in the acoustic environment AE and/or non-equal sensitivity of the loudspeaker channels in the acoustic environment AE. The frequency weighting arrangement is preferably implemented in the same DSP or CPU implementing the simulating sound level detector and integrator SSLD, and also receives the input signal IS. The frequency response characteristics FRC may preferably be stored in memory included in or connected to the DSP or CPU. The frequency response characteristics FRC may be determined as an approximation of the measured frequency response, per channel. Alternatively, the frequency response characteristics FRC may be determined based on multiple measurements. Even though such a frequency response characteristics FRC would generally be a less accurate approximation for the frequency response in a specific location, it may be simpler and more robust against small spatial variations in the listening position, which could be advantageous in some applications.

In an embodiment the frequency response characteristics FRC comprises frequency response data for the loudspeakers, e.g. measured by the loudspeaker manufacturer. In another embodiment the frequency response characteristics FRC are established by performing a measurement on location of the actual setup to determine the frequency response in the actual acoustic environment.

In a preferred embodiment, a measured frequency response FRC is "smoothed", e.g. by a $\frac{1}{12}$-octave resolution smoothing filter. The resulting response may then advantageously be approximated by an IIR filter, e.g. using the Yule-Walker method for recursive IIR digital filter design using a least-squares fit, or using an iterative optimization—such as the damped Gauss-Newton method—to minimize the difference between the actual and the desired frequency response of the IIR filter.

This embodiment may be preferable over the embodiment with transfer function characteristics TFC described above with reference to FIG. 8, in case computational complexity is an issue, or in case a greater robustness against the specific listening-position would be desired.

The frequency response characteristics FRC may preferably represent both differences in gain for the different channels, e.g. if the sensitivity of the loudspeakers were different, or if their placement in the acoustic environment AE caused acoustical level variation, and also the differences in the actual frequency response of the channels, i.e. the relative, effective sensitivity in different spectral regions, regardless of the absolute sensitivity.

Procedure to Compute an SPL_EST Employing the Frequency Response Characteristics FRC:

One embodiment of Mic-less sound level estimator MLE implementing frequency response characteristics FRC and corresponding filtering is described here, where x(c,t) refers to channel c of the input signal at time t. Further details of the variables and parameters may be found in the description of the embodiment of FIG. 4 above, mutatis mutandis.

Step 1. Frequency Response Filter

An IIR filter, implementing the frequency response characteristics FRC per channel, can be implemented using this linear difference equation. Let $FR_B$ and $FR_A$ denote the feedforward- and feedback-coefficients, respectively.

$$x_{FR}(c, t) = \sum_{i=0}^{FR_n} x(c, t-i) \cdot FR_B(c, i) - \sum_{i=1}^{FR_m} x_{FR}(c, t-i) \cdot FR_A(c, i) \quad \text{(Eq. 34)}$$

In an embodiment comprising filter banks instead of a frequency response weighting filter, Eq. 34 may be substituted with a simple calculation of energy per band of the filter bank, possibly combined with the A-weighting of step 2.

Steps 2-6, A-Weighting, RMS-Integration, Channel-Summation, Simulated Sound Pressure, $L_{eq}$-Calculation The rest of the estimation process may be performed for example as described above with reference to FIG. 4, i.e. similar to Eqs. 1-7, by using $x_{FR}$ instead of x in Eq. 1 and proceed through the other steps described above. In the final steps, for example $L_{Aeq,15}(lp,t)$ or $L_{C,pk}(lp,t)$ or $L_{Ex,8h}(lp,t)$ may be calculated, analogously to above descriptions and possibly with above-described variations or combinations, for example regarding several listening positions as described with reference to FIG. 9 above, an inter-channel correlation-corrected embodiment as described with reference to FIG. 6 above, or the embodiments described below.

Experiment

FIG. 11 shows, as example, a plot of a measured frequency response of a stereo sound system (nearfield, active studio monitors) in an acoustic environment AE (a studio control room), as a smoothed magnitude response at $\frac{1}{6}$th-octave resolution (solid line, FRC1) and 1-octave resolution (dashed line, FRC2). This frequency response characteristics FRC was produced as an approximation of the measured frequency response for the Left nearfield loudspeaker (of a stereo set) in the studio, at the primary listening position, i.e. with approximately a 30 degrees angle between the phantom center (between the stereo speakers) and the actual speaker.

For the experiment, a mono test signal was generated, consisting of $\frac{1}{3}$-octave filtered pink noise, in 9 successive octaves, 5 sec of each $\frac{1}{3}$-octave band. FIG. 12 shows a spectrogram analysis of the test signal.

FIG. 13 shows a "sliding" $L_{Aeq}$ SPL estimation computed by three different embodiments of the present invention, in the experiment with the sound system and acoustic environment described above with reference to FIG. 11 and the test signal described above with reference to FIG. 12. The three different embodiments used to estimate the SPL resulting from the test signal were the basic sound level detector and integrator SSLD described above with reference to FIG. 4, the sound level detector and integrator SSLD with transfer function characterictics TFC described above with reference to FIG. 8, and the sound level detector and integrator SSLD with frequency response characterictics FRC described above with reference to FIG. 10.

The upper curve SPL1 illustrated in FIG. 13 is the result of estimating the dB SPL of the test signal according to a basic sound level detector and integrator SSLD embodiment, and reflects the A-weighting employed (FIG. 5). The middle curve SPL2 in FIG. 13 was produced by further taking into account the transfer function characteristics TFC, measured for the sound system SS (one loudspeaker) and the acoustic environment AE of the experiment. The bottom curve SPL3 in FIG. 13 illustrates the result of the experiment when employing only the overall frequency response characteristics FRC, and can be seen as an approximation of the SSLD+TFC estimate (the middle curve SPL2).

In contrast to the test signal used in this experiment, a realistic signal would typically contain many frequencies across the spectrum, varying in power over time. Hence the relative effect of the transfer function characteristics TFC or the frequency response characteristics FRC on the estimate would also vary over time. In an integrated measure of SPL or Sound Exposure, the effect of the transfer function characteristics TFC and frequency response characteristics FRC would likewise be integrated. In an instantaneous or short-term measure of SPL, the effect of the transfer function characteristics TFC or frequency response characteristics FRC would depend on the characteristics of the sound system SS and acoustic environment AE, combined with the frequency content and level of the input signal, at that moment.

Approximation of Sound System Properties

FIG. 14 illustrates an embodiment of the invention comprising a sound system SS which receives an input signal IS and produces sound in an acoustic environment AE based on the input signal. The sound system comprises an audio amplifier AA and multiple loudspeakers LS. The sound system may optionally comprise further audio processing modules, e.g. decoder, equalizer, compressor, filter, etc. The input signal is a mono-, stereo- or multichannel analog or digital audio signal and the sound system may receive the input signal from an external source or itself integrate with a radio, media player, mixer table, or other audio source establishing the input signal.

The audio amplifier AA may be any kind of audio amplifier, and the number of channels should preferably correspond to the relevant loudspeaker setup. The multiple loudspeakers are located at different positions relative to the acoustic environment, and may produce audio from different audio channels and/or from common audio channels. For example, the audio amplifier may be a stereo amplifier and the multiple loudspeakers may comprise two speakers receiving different audio channels in a stereo setup or e.g. the audio amplifier is a multi-channel receiver and multiple loudspeakers comprise 6 speakers receiving different audio channels in a surround sound setup, including a subwoofer channel. In another example the multiple loudspeakers may comprise 25 speakers all rendering the same audio channel, for example for background music in a supermarket. In another example the multiple loudspeakers may comprise 8 speakers whereof three speakers are positioned along a left side of a room and all receiving a left channel, three speakers likewise positioned along a right side of the room and all receiving a right channel, and the remaining two speakers receiving a subwoofer channel.

Further, a Mic-less sound level estimator MLE is provided, which is arranged to provide, on the basis of the input signal, an estimate EST of the SPL or SE produced in at least one position in the acoustic environment. In the present embodiment, the Mic-less sound level estimator comprises a Simulating sound level detector and integrator SSLD and an approximation of sound system properties SSP to base the estimates on. In the embodiment of FIG. 14, and contrary to the embodiment of FIG. 4, the sound system SS is not necessarily level-calibrated with its loudspeakers in the acoustic environment AE. Hence, in order to obtain information about the sound system in the acoustic environment to be able to estimate an SPL or SE, one or more measurements are made by a microphone MIC in the acoustic environment to produce the approximation of sound system properties. The microphone measurements may be performed once, e.g. at the time of installation and each time major changes are made to the system or acoustic environment, or regularly, e.g. at regular intervals, at each power up, before each significant use of the system, e.g. for concerts, etc. The measurements may also be desired or even required regularly for verification of the Mic-less sound level estimator.

The coupling of the microphone to the acoustic environment and the Mic-less sound level estimator indicates a temporary or periodic connection, and a possibly somewhat loose relation between the microphone and the estimator, as the microphone measurements in an embodiment may be obtained, analyzed and formalised as sound system property approximations before they are transferred to the Mic-less sound level estimator. In another embodiment the measurement microphone may be directly connected to the Mic-less sound level estimator, which may perform the analysis and formalising directly on the raw measurements.

To illustrate this in further detail, FIG. 15 shows a measuring and approximation step where a test signal TS, e.g. a band-limited pink noise signal, is provided as input signal to the sound system SS and produced as sound in the acoustic environment AE. The measurement microphone MIC is installed during this step to measure the resulting test sound, and the Mic-less sound level estimator MLE, or an external device, e.g. a laptop or tablet computer, establishes an approximation of sound system properties SSP based on the measured sound, and stores this with the Mic-less sound level estimator.

The approximations of sound system properties may be stored in a memory, e.g. a database, together with the DSP or CPU calculating the SPL estimate, and may be stored as any suitable abstraction level, e.g. as raw measurements, as FIR or IIR filter parameters, as a ratio between in- and out-level, possibly at different frequencies, as equivalent model parameters, etc. The approximation of system properties may preferably comprise a representation of a relation between levels of the input signal TS, IS, and the resulting Sound-Pressure Levels in the acoustic environment AE, thereby resembling the knowledge of a level-calibrated sound system, and thereby facilitating using the same procedures and equations as described above with reference to the embodiments of e.g. FIG. 4. The system properties may further relate to properties of the sound system, the acoustic environment or combinations thereof, for example a transfer function or frequency response of the loudspeakers or, preferably, the loudspeakers in the particular acoustic environment, information about the location of the loudspeakers, delays, how they interact with the room at different frequencies, room characteristics such as reverberation or diffuseness.

In an embodiment, measurements are made at two or more positions, by moving the microphone and repeat the test or by installing more than one microphone. Thereby information for several listening positions are obtained, which may be applied in the estimation procedure, e.g. as described above with reference to FIG. 9.

In an embodiment, the test signal TS is transmitted to only one loudspeaker at a time, to measure each combination of loudspeaker and listening position. In a more advanced embodiment, a multi-channel signal with different spectral content in each channel is used as test signal. Thereby each loudspeaker produces, simultaneously, a different sound with regard to spectral content, and if the different spectral content is carefully designed, it may be possible to distinguish each individual loudspeaker from the acoustically mixed raw measurement in the analysis. Thereby approximated system properties for all loudspeakers and one or more listening positions may be produced quickly and efficiently by one or a few averaging noise bursts from the loudspeakers. This is particularly advantageous for systems where frequent measurements are required, e.g. for regular verification of the sound level estimates. The spectral content of the test signal is frequency-domain content of the signal, i.e. the power per frequency-interval. Spectral content is considered different for two channels when the frequency spectrum of one channel, for some time period, differs significantly from the frequency spectrum of the other channel, for the same time period, and this may e.g. be obtained by using different pure tones in the different channels, e.g. by having each loudspeaker produce a number of pure tones in the low, middle and high frequency ranges, yet different and non-harmonic pure tones in each loudspeaker, or by having each loudspeaker produce a band-limited noise signal, yet with different bands or insignificant overlap of bands between the loudspeakers at the same time.

Proceeding to FIG. 16 an operation step is shown, where the measurement microphone is no longer present, i.e. no feedback or measurements from the acoustic environment exists, and the system works as described above with reference to e.g. FIG. 4 or FIG. 14.

Given the approximation of sound system properties SSP, the Simulating sound level detector and integrator SSLD can calculate estimates EST such as Sound Pressure Level estimates SPL-EST and Sound Exposure estimates SE-EST, in real-time and on the basis of the input signal IS.

The estimation process may be performed for example as described above with reference to FIG. 4, i.e. similar to eqs. 1-7, by using the approximated system properties SSP instead of the level calibration values in Eq. 4, mutatis mutandis. Thereby, for example $L_{Aeq,15}(lp,t)$ or $L_{C,pk}(lp,t)$ or $L_{EX,8h}(lp,t)$ may be calculated, analogously to above descriptions and possibly with above-described variations or combinations, for example regarding several listening positions as described with reference to FIG. 9 above, an inter-channel correlation-corrected embodiment as described with reference to FIG. 6 above, embodiments further considering transfer function characteristics or frequency response characteristics as described with reference to FIGS. 8 and 10 above.

Reverberation Characteristics

An embodiment of the Mic-less sound level estimator MLE takes into account reverberation characteristics RC of the acoustic environment. FIG. 17 shows a diagram of such an embodiment, where an acoustic space emulator ASE essentially implements a simplistic artificial reverberation that then applies reverb to the input signal IS prior to its processing by the sound level detector and integrator SSLD. In contrast to common artificial reverberation methods, the artificial reverberation added by the acoustic space emulator ASE is not meant to sound like the real acoustic environment AE at all, but only emulate those properties relevant to the subsequent estimate of SPL or SE, i.e. those properties provided in the reverberation characteristics RC. The reverberation characteristics may for example simply be the reverberation time, such as an $R_{T60}$ and an Early Decay Time. Such parameters may be measured of a real room or hall (acoustic environment AE) e.g. using the Schroeder method, or they may be provided as parameters, e.g. based on knowledge of the inner dimensions of the acoustic environment AE. The reverberation characteristics RC parameters may advantageously be provided per octave, for a more detailed emulation of the acoustic space emulator ASE.

FIG. 18 shows a diagram of another embodiment taking into account reverberation of the acoustic environment AE. In this embodiment the sound level detector and integrator SSLD is given auxiliary information by an acoustic space SPL emulator ASSE, by means of which it may provide a more accurate estimate of SPL or Sound Exposure. The acoustic space SPL emulator ASSE employs basic assumptions of the acoustics of the acoustic environment AE, such as its reverberation decaying at an exponential rate; the actual rate supplied in the reverberation characteristics RC. When the sound level detector and integrator SSLD calculates the short-term RMS (e.g. Eq. 14), it may then—as an additional step—filter the $x_{RMS}$ to apply the "extra" exponential decay determined by the acoustic space SPL emulator ASSE. Thus, the effect of the reverberation on the SPL estimate is applied in the RMS-domain instead of applying the reverberation to the actual input signal IS (which would be computationally more complex).

The embodiments of FIG. 17 and FIG. 18 with reverberation characteristics RC and acoustic space emulation ASE or acoustic space SPL emulation ASSE may be combined with any of the other embodiments described above, e.g. by considering further listening positions, inter-channel correlation, transfer function or frequency response characteristics of the loudspeakers, various calibration methods and test signals, etc.

Auxiliary Microphone

In variations of any of the embodiments described above, e.g. with reference to FIG. 4, FIG. 6, FIG. 8, FIG. 9, FIG. 10, FIG. 14, FIG. 15, FIG. 16, FIG. 17 or FIG. 18, an auxiliary microphone may be added to the system. In preferred embodiments, the auxiliary microphone is not for measuring sound level at a listening position, as the Mic-less sound level estimator MLE of the present invention is also estimating, e.g., SPL or SE, in embodiments with the auxiliary microphone. However, in preferred embodiments, the auxiliary microphone may for example be permanently installed at a location within the acoustic environment where it may remain visually discrete and non-disturbing, and/or not be in the way of people moving around, rearranging furniture, etc. In embodiments with an auxiliary microphone, it may be used to provide feedback to the Mic-less sound level estimator MLE about the sound present at the location of the auxiliary microphone. In several setups the feedback from the auxiliary microphone is not usable directly for comparing with the estimated SPL, but the feedback from the auxiliary microphone may preferably be analyzed to detect indication of assumptions and approximations of the loudspeakers, acoustic environment, etc., being incorrect or changed since last calibration. In an embodiment, the sound measured by the auxiliary microphone in response to a test signal, e.g. during calibration, is stored, or properties thereof are stored, e.g. as a parametrized version of the sound or as key properties such as amplitude, phase, spectrum, etc. During normal use or later calibrations, sound measured by the auxiliary microphone may be compared with the stored version, properties or parameters, thereby enabling a detection of changes or errors. In an embodiment, the comparing of measurements from the auxiliary microphone with the stored reference measurement, properties or parameters, is performed continuously or frequently and the result used to make slight adjustments to the sound level estimates, or to detect errors. Thereby slowly changing properties that may assumedly be less location-specific, e.g. physical wear or deformation in the loudspeakers, changes of temperature or static air pressure, etc., may be compensated for in the estimate without requiring a new calibration. Emerging errors which affect the generated sound, e.g. a disconnection of a loudspeaker, a damaged loudspeaker, bad cable connections, etc., may also be detected in an embodiment with an auxiliary microphone. The analysis of the signal from the auxiliary microphone may be considering the sound system as a whole, or consider each channel individually, e.g. to determine a loudspeaker disconnect. In various embodiments, the auxiliary microphone needs not be a high-quality or super-sensitive microphone, as the sound measured thereby is not necessarily used as an audio signal, but preferably rather properties thereof. The auxiliary microphone may be any kind of transducer responsive to acoustic sound. In an embodiment several auxiliary microphones are provided. At a block-diagram level, an embodiment comprising an auxiliary microphone may be similar to e.g. one of the embodiments shown in FIG. 14 or 15, by using the microphone MIC as auxiliary microphone instead of measurement microphone.

What is claimed is:

1. A method of providing an estimate of a Sound Pressure Level (SPL) or Sound Exposure (SE) of sound produced in an acoustic environment (AE) by multiple loudspeakers of a sound system in response to an electrical or optical representation of an input audio signal, the acoustic environment having at least one listening position, the method comprising:
an initial step of obtaining an approximation of sound system properties for each of the at least one listening position in the acoustic environment, the approximation of sound system properties being determined using a microphone measurement;
receiving the electrical or optical input audio signal in a sound level detector/integrator (SSLD) in the sound system without using a microphone;
determining in real time with the SSLD, in response to receiving the input audio signal and the approximation of sound system properties, individual estimates of the Sound Pressure Level (SPL-EST) or Sound Exposure (SE-EST) simultaneously at one or more of the at least one listening positions in the acoustic environment; and
providing the determined SPL-EST or SE-EST as an output, wherein:
the determining of SPL EST includes:
(a) frequency weighting;
(b) RMS integration based on:

$$x_{RMS}(c,t) = \sqrt{\frac{1}{T}\sum_{i=1}^{T} x_A(c, t-i)^2} \, ;$$

(c) channel summation in response to a multi-channel audio input signal, otherwise omitting step (c) in response to receipt of a single channel audio input single;

(d) establish a simulated averaged sound pressure in the AE; and
(e) $L_{eq}$ calculation to generate the estimated, equivalent continuous sound level SPL_EST.

2. The method of claim 1, wherein the method comprises calculating an inter-channel correlation of one or more pairs of channels of the input signal, and further modifying the estimate of a Sound Pressure Level or Sound Exposure by using the calculated inter-channel correlation in the determining in real time the estimate of the Sound Pressure Level or Sound Exposure.

3. The method of claim 2, wherein the method comprises providing a pre-determined diffuseness of the acoustic environment, and further modifying the estimate of Sound Pressure Level or Sound Exposure by using the calculated inter-channel correlation and the diffuseness of the acoustic environment in the determining in real-time estimate of the Sound Pressure Level or Sound Exposure.

4. The method of claim 1, wherein the method comprises attenuating the sound produced by the sound system based on the estimate of Sound Pressure Level or Sound Exposure in order to limit the estimated Sound Pressure Level or Sound Exposure from exceeding a threshold.

5. The method of claim 1, wherein the approximation of sound system properties comprises a representation of a relation between an acoustic output level and an electrical or digital input level of the sound system in the acoustic environment.

6. The method of claim 1, wherein the approximation of sound system properties comprises approximations of frequency response of one or more of the multiple loudspeakers in the acoustic environment.

7. The method of claim 1, wherein the approximation of the sound system properties comprises approximations of reverberation characteristic of the acoustic environment.

8. The method of claim 1, wherein the approximation of sound system properties comprises a transfer function between each pair of one of the multiple loudspeakers and one of the at least one listening positions in the acoustic environment.

9. The method of claim 1, wherein the providing of the determined estimates as an output comprises visually displaying the determined estimates.

10. The method of claim 1, wherein the providing of the determined estimates as an output comprises logging the determined estimates.

11. The method of claim 1, wherein the providing of the determined estimates as an output comprises storing the determined estimates in a memory.

12. The method of claim 1, wherein the providing of the determined estimates as an output comprises transmitting the determined estimates over a network.

13. A method of providing an estimate of a Sound Pressure Level (SPL) or Sound Exposure (SE) of sound produced in an acoustic environment (AE) by multiple loudspeakers of a sound system in response to an electrical or optical representation of an input audio signal, the acoustic environment having at least one listening position, the method comprising:
an initial step of obtaining an approximation of sound system properties for each of the at least one listening position in the acoustic environment, the approximation of sound system properties being determined using a microphone measurement;
receiving the electrical or optical input audio signal in a sound level detector/integrator (SSLD) in the sound system without using a microphone;

determining in real time with the SSLD, in response to receiving the input audio signal and the approximation of sound system properties, individual estimates of the Sound Pressure Level (SPL_EST) or Sound Exposure (SE_EST) simultaneously at one or more of the at least one listening positions in the acoustic environment; and providing the determined SPL_EST or SE_EST as an output, wherein:

the determining of SE_EST includes:
(a) frequency weighting;
(b) RMS integration based on:

$$x_{INT}(c, t) = \sqrt{\sum_{i=1}^{t} x_A(c, t-i)^2} \ ;$$

(c) channel summation in response to a multi-channel audio input signal, otherwise omitting step (c) in response to receipt of a single channel audio input single;
(d) establish a simulated averaged sound pressure in the AE; and
(e) $L_{eq}$ calculation to generate the estimated sound exposure level over a period of time SE_EST.

14. The method of claim 13, wherein the method comprises calculating an inter-channel correlation of one or more pairs of channels of the input signal, and further modifying the estimate of a Sound Pressure Level or Sound Exposure by using the calculated inter-channel correlation in the determining in real time the estimate of the Sound Pressure Level or Sound Exposure.

15. The method of claim 14, wherein the method comprises providing a pre-determined diffuseness of the acoustic environment, and further modifying the estimate of Sound Pressure Level or Sound Exposure by using the calculated inter-channel correlation and the diffuseness of the acoustic environment in the determining in real-time estimate of the Sound Pressure Level or Sound Exposure.

16. The method of claim 13, wherein the method comprises attenuating the sound produced by the sound system based on the estimate of Sound Pressure Level or Sound Exposure in order to limit the estimated Sound Pressure Level or Sound Exposure from exceeding a threshold.

17. The method of claim 13, wherein the approximation of sound system properties comprises a representation of a relation between an acoustic output level and an electrical or digital input level of the sound system in the acoustic environment.

18. The method of claim 13, wherein the approximation of sound system properties comprises approximations of frequency response of one or more of the multiple loudspeakers in the acoustic environment.

19. The method of claim 13, wherein the approximation of the sound system properties comprises approximations of reverberation characteristic of the acoustic environment.

20. The method of claim 13, wherein the approximation of sound system properties comprises a transfer function between each pair of one of the multiple loudspeakers and one of the at least one listening positions in the acoustic environment.

21. The method of claim 13, wherein the providing of the determined estimates as an output comprises visually displaying the determined estimates.

22. The method of claim 13, wherein the providing of the determined estimates as an output comprises logging the determined estimates.

23. The method of claim 13, wherein the providing of the determined estimates as an output comprises storing the determined estimates in a memory.

24. The method of claim 13, wherein the providing of the determined estimates as an output comprises transmitting the determined estimates over a network.

25. A real-time sound level estimator for real-time estimation of Sound Pressure Level (SPL) or Sound Exposure (SE) of sound produced in an acoustic environment (AE) by multiple loudspeakers of a sound system in response to an electrical or optical representation of an input audio signal, the acoustic environment having at least one listening position, the sound level estimator comprising:

an input;
a processor coupled to the input;
a memory accessible by the processor, the memory structured to store instructions for the processor; and
an output coupled to the processor;
wherein the processor is arranged to perform the following steps:
an initial step of obtaining an approximation of sound system properties for each of the at least one listening position in the acoustic environment, the approximation of sound system properties being determined using a microphone measurement;
receiving the electrical or optical input audio signal in a sound level detector/integrator (SSLD) in the sound system without using a microphone;
determining in real time with the SSLD, in response to receiving the input audio signal and the approximation of sound system properties, individual estimates of the Sound Pressure Level (SPL_EST) or Sound Exposure (SE_EST) simultaneously at one or more of the at least one listening positions in the acoustic environment; and
providing the determined SPL_EST or SE_EST as an output, wherein:
the determining of SPL_EST includes:
(a) frequency weighting;
(b) RMS integration based on:

$$x_{RMS}(c, t) = \sqrt{\frac{1}{T}\sum_{i=1}^{T} x_A(c, t-i)^2} \ ;$$

(c) channel summation in response to a multi-channel audio input signal, otherwise proceeding to step (d) in response to receipt of a single channel audio input single;
(d) establish a simulated averaged sound pressure in the AE; and
(e) $L_{eq}$ calculation to generate the estimated, equivalent continuous sound level SPL_EST.

26. A real-time sound level estimator for real-time estimation of Sound Pressure Level (SPL) or Sound Exposure (SE) of sound produced in an acoustic environment (AE) by multiple loudspeakers of a sound system in response to an electrical or optical representation of an input audio signal, the acoustic environment having at least one listening position, the sound level estimator comprising:

an input;
a processor coupled to the input;
a memory accessible by the processor, the memory structured to store instructions for the processor; and
an output coupled to the processor;

wherein the processor is arranged to perform the following steps:
an initial step of obtaining an approximation of sound system properties for each of the at least one listening position in the acoustic environment, the approximation of sound system properties being determined using a microphone measurement;
receiving the electrical or optical input audio signal in a sound level detector/integrator (SSLD) in the sound system without using a microphone;
determining in real time with the SSLD, in response to receiving the input audio signal and the approximation of sound system properties, individual estimates of the Sound Pressure Level (SPL_EST) or Sound Exposure (SE_EST) simultaneously at one or more of the at least one listening positions in the acoustic environment; and
providing the determined SPL_EST or SE_EST as an output, wherein:

the determining of SE_EST includes:
(a) frequency weighting;
(b) RMS integration based on:

$$x_{INT}(c, t) = \sqrt{\sum_{i=1}^{t} x_A(c, t-i)^2} \ ;$$

(c) channel summation in response to a multi-channel audio input signal, otherwise proceeding to step (d) in response to receipt of a single channel audio input single;
(d) establish a simulated averaged sound pressure in the AE; and
(e) $L_{eq}$ calculation to generate the estimated sound exposure level over a period of time SE_EST.

* * * * *